United States Patent
Hayakawa

(10) Patent No.: US 10,097,687 B2
(45) Date of Patent: Oct. 9, 2018

(54) NUISANCE CALL DETECTION DEVICE AND METHOD

(71) Applicant: FUJITSU LIMITED, Kawasaki-shi, Kanagawa (JP)

(72) Inventor: Shoji Hayakawa, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 15/226,960

(22) Filed: Aug. 3, 2016

(65) Prior Publication Data

US 2017/0064076 A1     Mar. 2, 2017

(30) Foreign Application Priority Data

Aug. 31, 2015 (JP) ................. 2015-171536

(51) Int. Cl.
| | |
|---|---|
| *H04M 3/436* | (2006.01) |
| *G10L 25/51* | (2013.01) |
| *H04M 3/42* | (2006.01) |
| *G10L 25/63* | (2013.01) |
| *G10L 15/08* | (2006.01) |
| *G10L 25/30* | (2013.01) |

(52) U.S. Cl.
CPC ............ *H04M 3/436* (2013.01); *G10L 25/51* (2013.01); *G10L 25/63* (2013.01); *H04M 3/42221* (2013.01); *G10L 25/30* (2013.01); *G10L 2015/088* (2013.01)

(58) Field of Classification Search
CPC ... H04M 3/436; H04M 3/42221; G10L 25/51; G10L 25/63; G10L 25/30; G10L 2015/088
See application file for complete search history.

(56) References Cited

U.S. PATENT DOCUMENTS

| | | | |
|---|---|---|---|
| 8,391,445 B2 * | 3/2013 | Hoblit | H04M 1/57 370/352 |
| 8,510,215 B2 * | 8/2013 | Gutierrez | G06Q 20/24 705/38 |
| 9,692,885 B2 * | 6/2017 | Bhupati | H04M 3/2281 |

(Continued)

FOREIGN PATENT DOCUMENTS

| | | |
|---|---|---|
| JP | 2010-258556 | 11/2010 |
| JP | 2012-070218 | 4/2012 |

(Continued)

*Primary Examiner* — Nafiz E Hoque
(74) *Attorney, Agent, or Firm* — Fujitsu Patent Center

(57) ABSTRACT

A nuisance call detection device that determines whether a telephone call in which a connection is established between a first telephone and a second telephone is a nuisance call and detects the nuisance call, analyzes a voice signal for one telephone call to calculate a plurality of pieces of determination information used for determination as to whether the telephone call is a nuisance call, simultaneously calculates information on a length of a conversation for the one telephone call, further calculates each weighting factor of the plurality of pieces of determination information in accordance with a length of the conversation, then calculates a nuisance call evaluation value based on a value obtained by multiplying each of the plurality of pieces of determination information by the weighting factor, and determines based on the nuisance call evaluation value whether the telephone call is a nuisance call.

13 Claims, 30 Drawing Sheets

(56) References Cited

U.S. PATENT DOCUMENTS

| | | | |
|---|---|---|---|
| 2003/0033145 A1* | 2/2003 | Petrushin | G10L 17/26 704/236 |
| 2012/0287823 A1* | 11/2012 | Lin | H04M 3/42042 370/259 |
| 2013/0006630 A1 | 1/2013 | Hayakawa et al. | |
| 2014/0136194 A1* | 5/2014 | Warford | G10L 17/02 704/233 |
| 2015/0269946 A1* | 9/2015 | Jones | G10L 17/22 704/273 |

FOREIGN PATENT DOCUMENTS

| | | |
|---|---|---|
| JP | 2013-011830 | 1/2013 |
| JP | 2013-214963 | 10/2013 |
| JP | 2015-050724 | 3/2015 |

\* cited by examiner

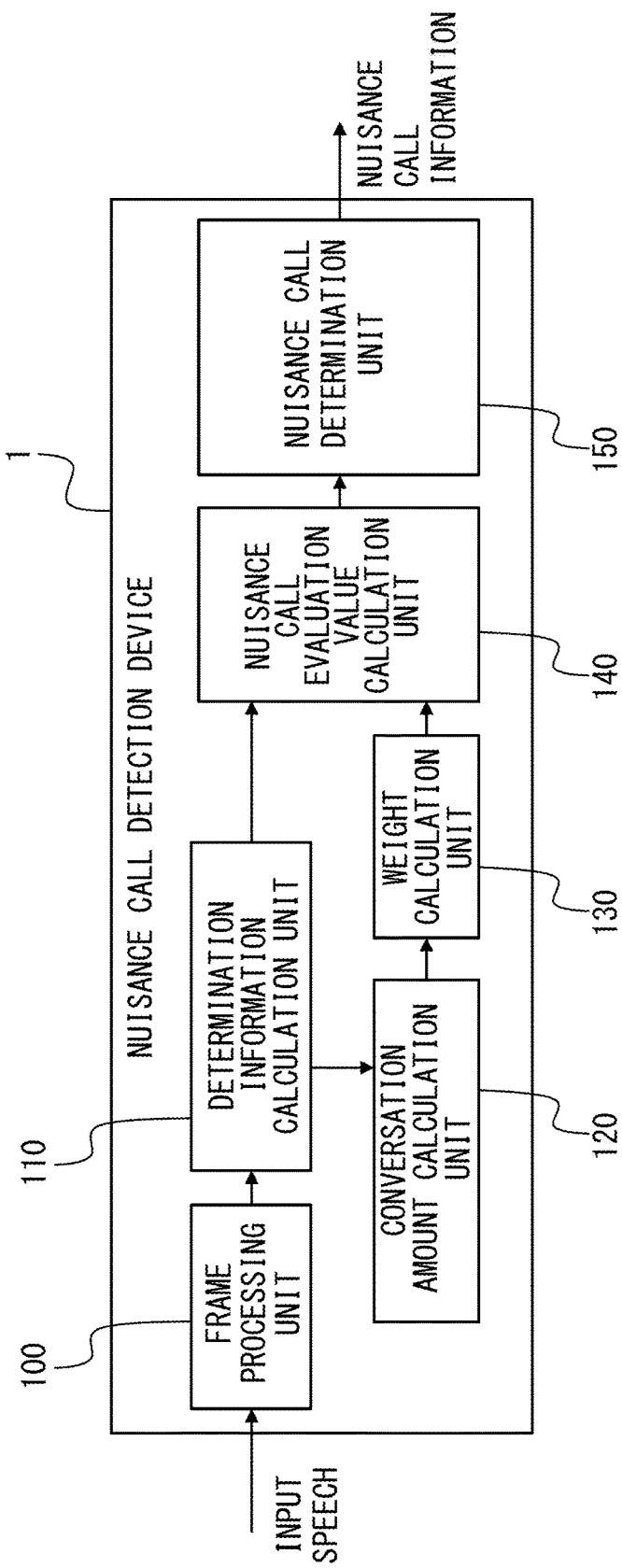
F I G. 1

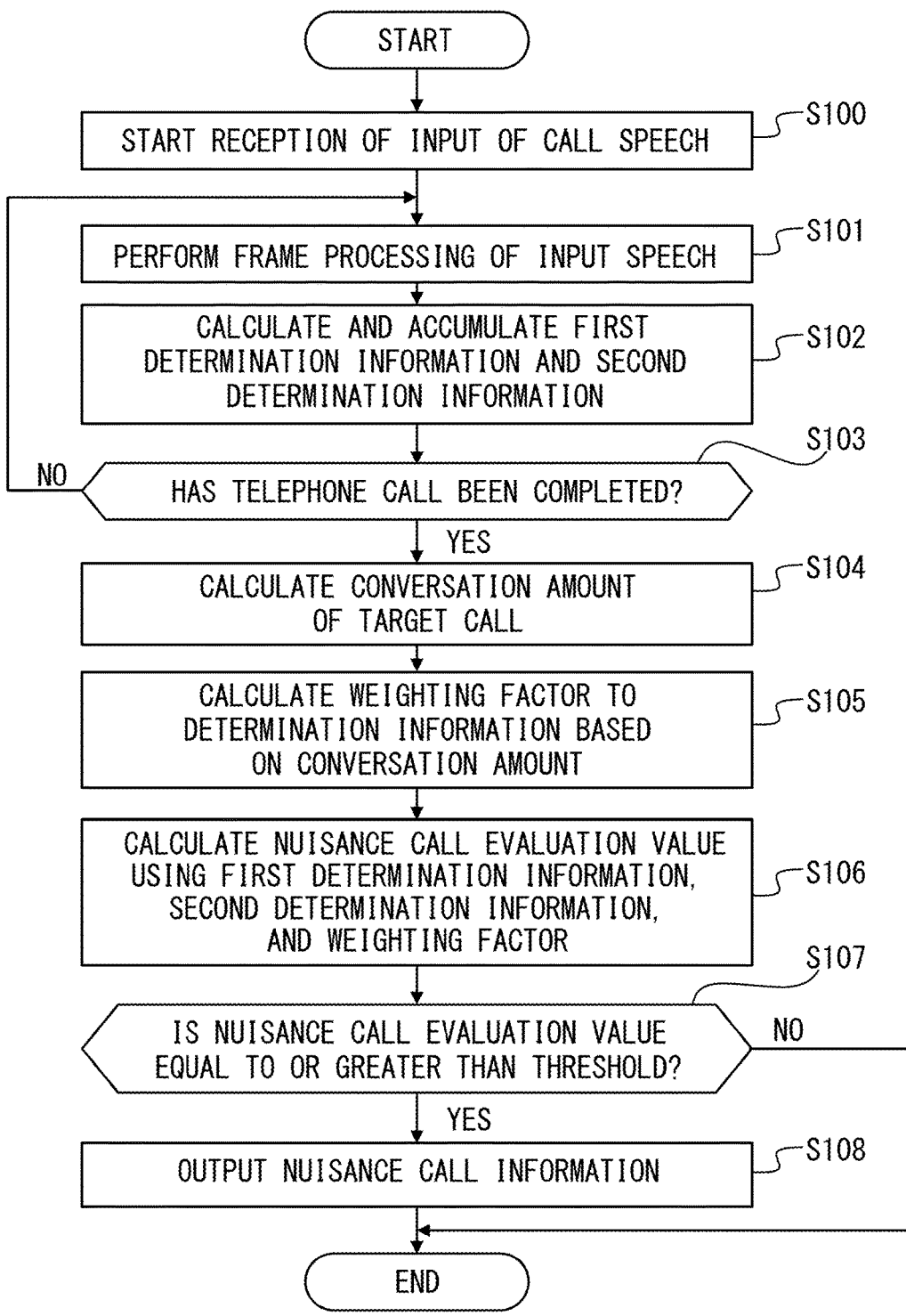
F I G. 2

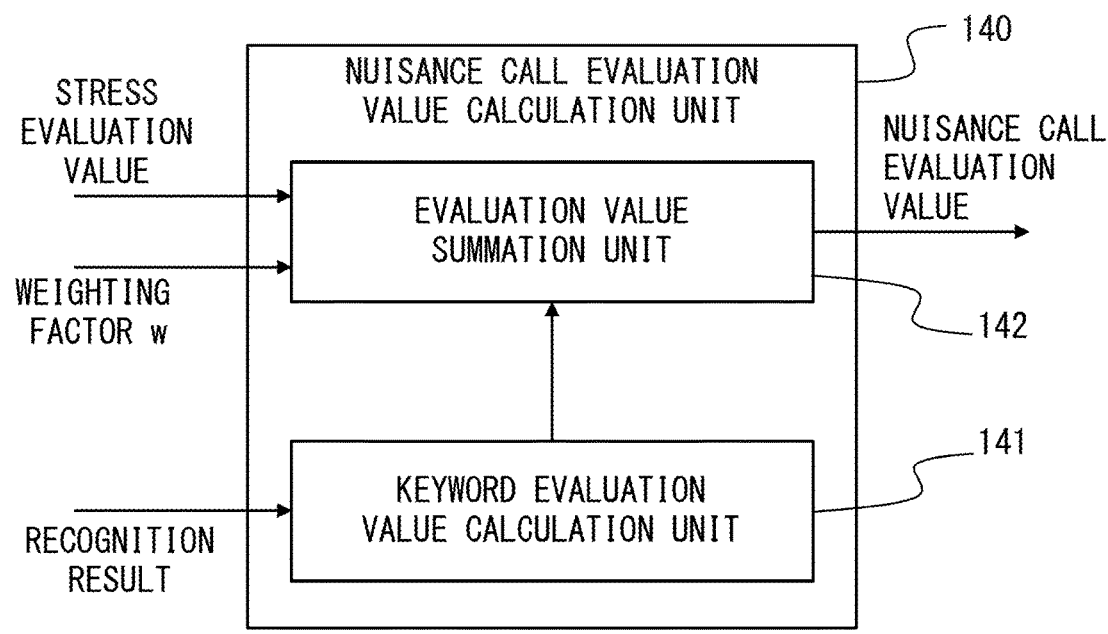
F I G. 5 B

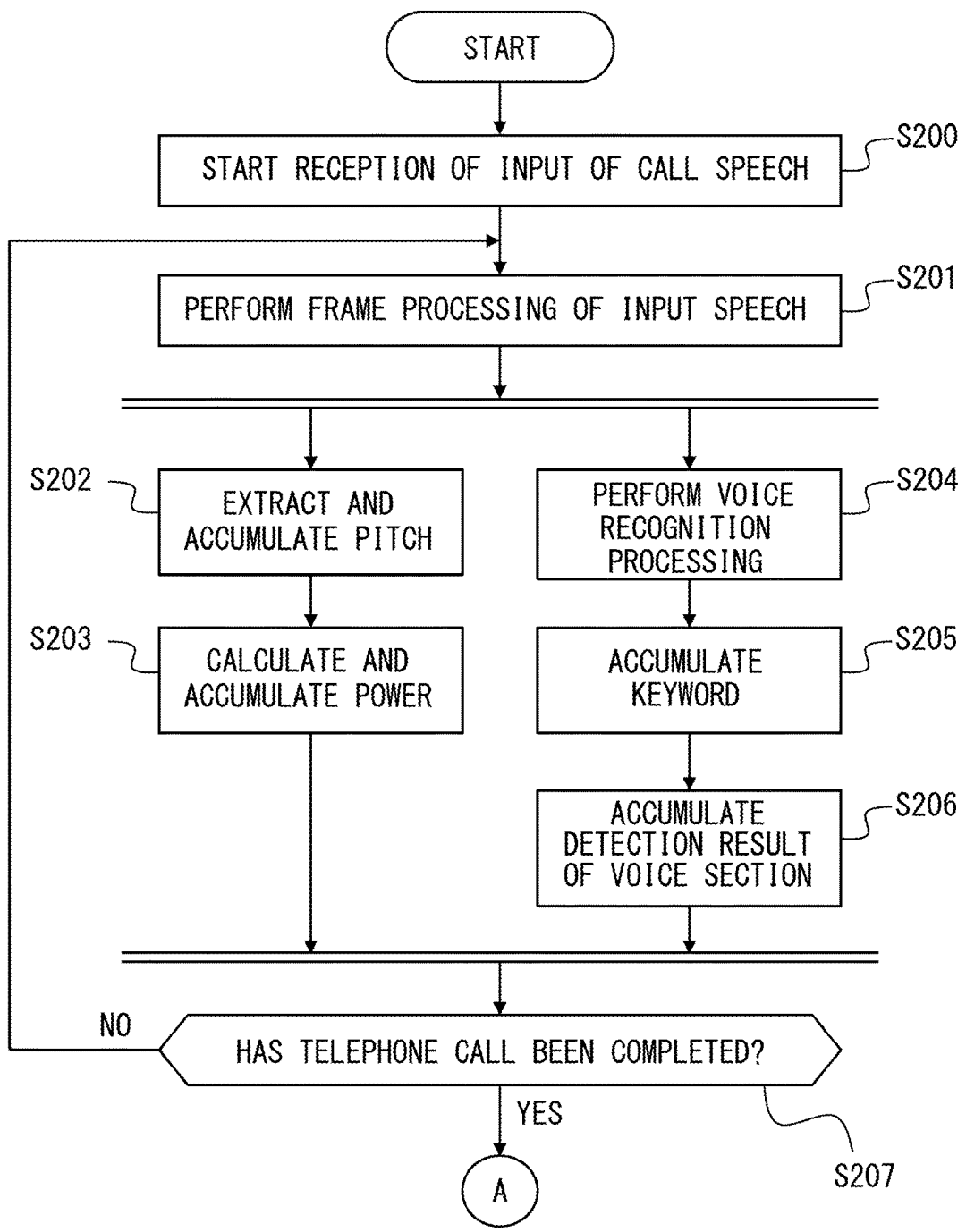
F I G. 6 A

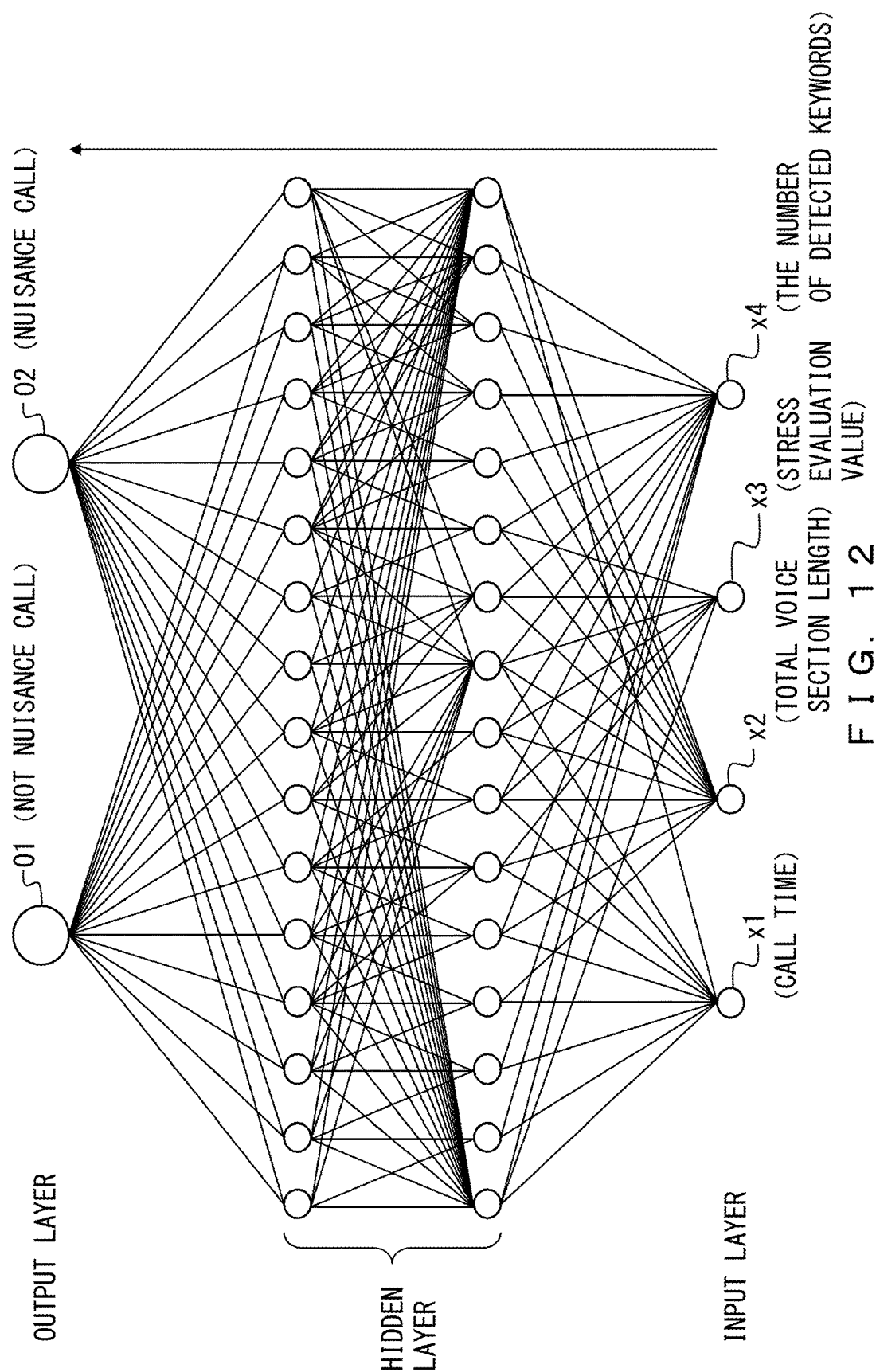
F I G. 12

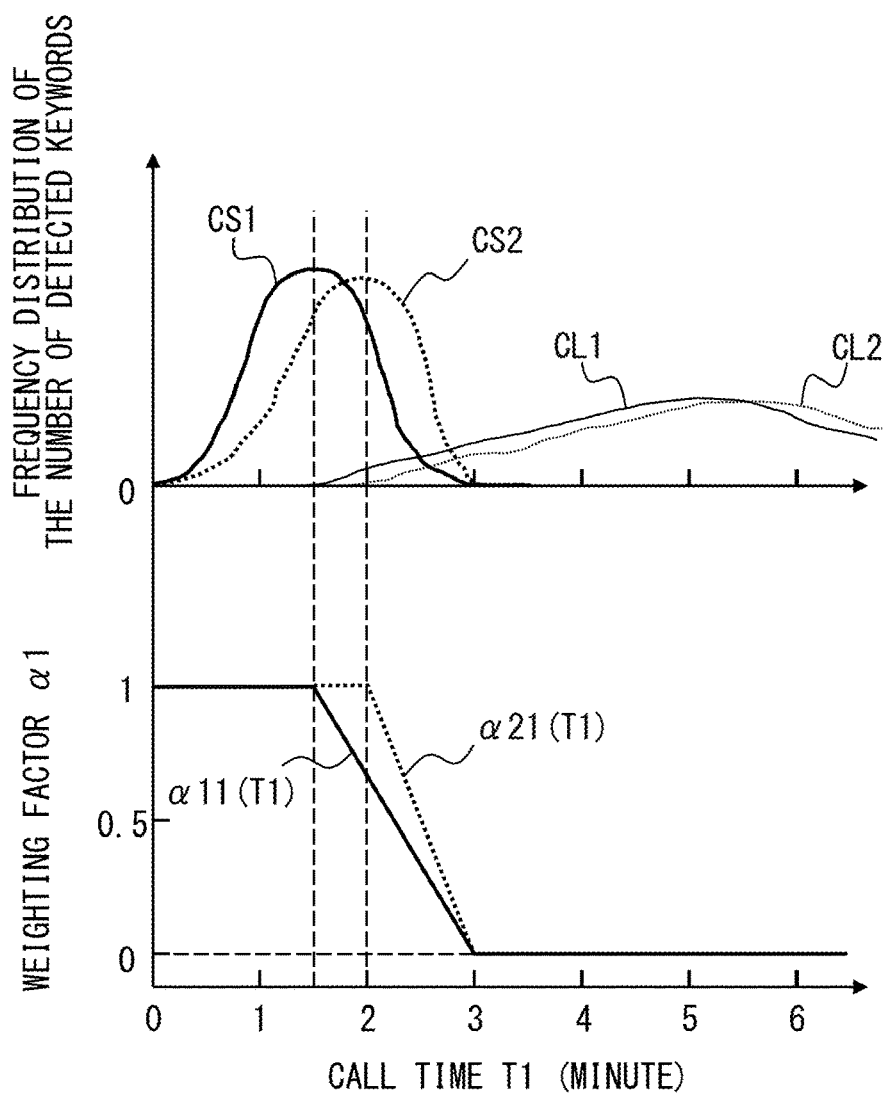
F I G. 19

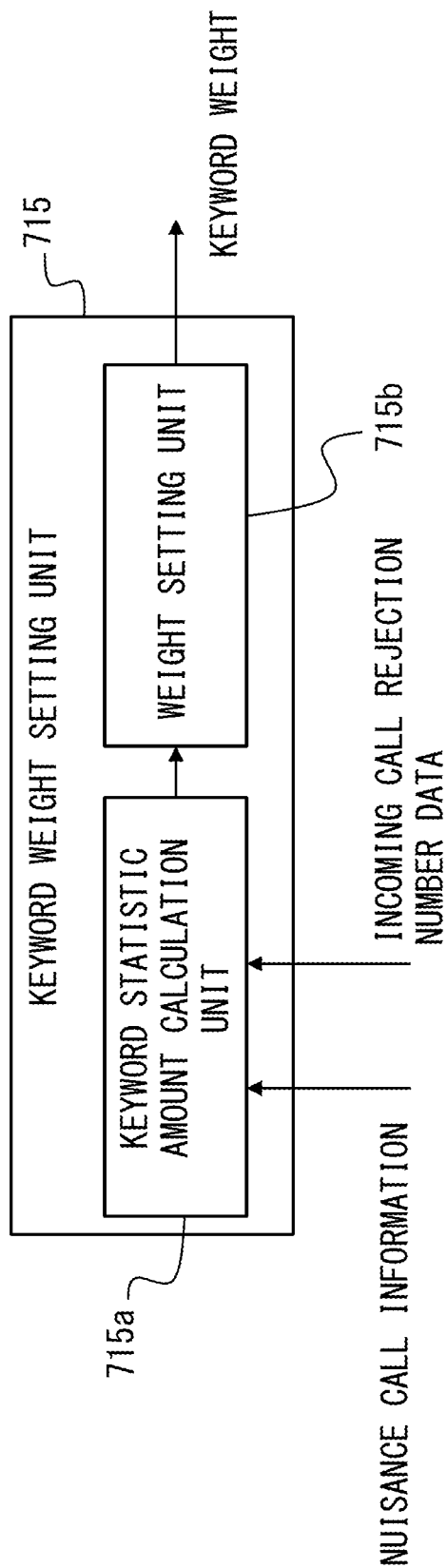
F I G. 20B

KEYWORD LIST — 143

| FIRST LIST (FOR T1, T2≧TTH) | |
|---|---|
| KEYWORD | WEIGHT |
| INVESTMENT MANSION | β(1) |
| PRE-LISTED SHARES | β(2) |
| PENSION MEASURES | β(3) |
| ⋮ | ⋮ |

143-3

| SECOND LIST (FOR T1, T2<TTH) | |
|---|---|
| KEYWORD | WEIGHT |
| I HAVE NO INTEREST. | γ(1) |
| IT IS ANNOYING. | γ(2) |
| I DO NOT NEED IT. | γ(3) |
| ⋮ | ⋮ |

143-4

F I G. 2 1

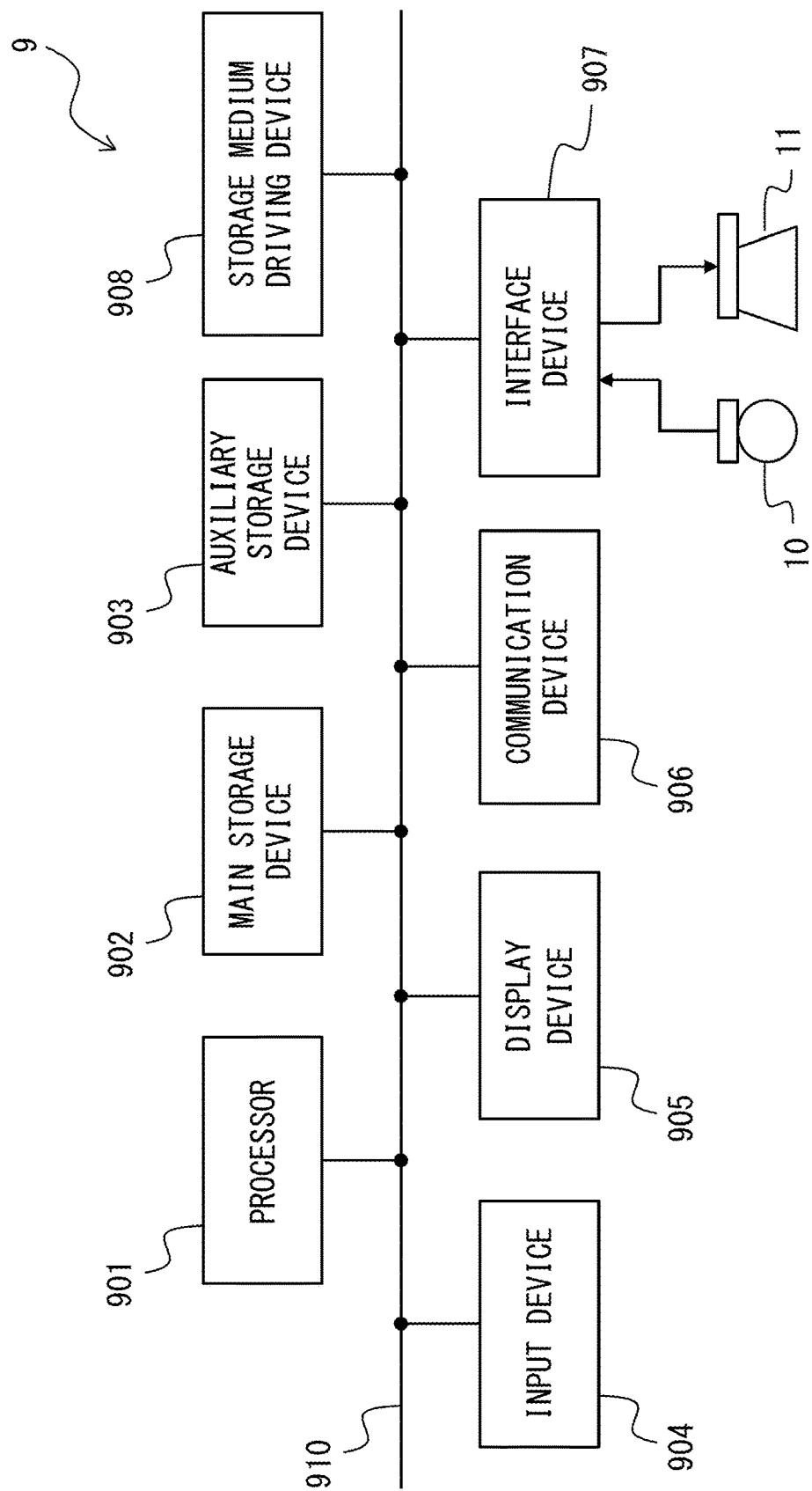

NUISANCE CALL DETECTION DEVICE AND METHOD

CROSS-REFERENCE TO RELATED APPLICATIONS

This application is based upon and claims the benefit of priority of the prior Japanese Patent Application No. 2015-171536, filed on Aug. 31, 2015, the entire contents of which are incorporated herein by reference.

FIELD

The embodiments discussed herein are related to a device that detects a nuisance call.

BACKGROUND

Telephone calls (so-called nuisance calls) have been increasing rapidly to an indefinite number of telephones for the purposes of sales or solicitation of goods, and therefore effective countermeasures are desired.

As one known technique regarding nuisance call countermeasures, a database (blacklist) of telephone numbers used for nuisance calls has been made, and an incoming call from the telephone number is rejected (for example, refer to Document 1). In reality, when incoming nuisance calls are rejected using the database, calls from telephone numbers that are not registered in the database are received. Therefore, a technique has been proposed recently in which phone call speech is analyzed and nuisance calls are determined early.

As a known technique regarding the above nuisance call countermeasures, when voice recognition is performed during a telephone call and a particular keyword is detected, it is reported that the nuisance call is received using electronic mail etc. to an address that has been previously specified (for example, refer to Document 2).

Further, as another known technique regarding nuisance call countermeasures, an evaluation value representing a degree of stress etc. of a speaker is calculated based on a statistical amount of pitch and power of call speech and an abnormal state of the speaker is detected based on the evaluation value (for example, refer to Document 3).

Document 1: Japanese Laid-open Patent Publication No. 2013-214963
Document 2: Japanese Laid-open Patent Publication No. 2012-70218
Document 3: Japanese Laid-open Patent Publication No. 2013-11830

SUMMARY

According to an aspect of the embodiment, a nuisance call detection device that determines whether a telephone call is a nuisance call, in which, in response to a request from a first telephone, a connection is established between the first telephone and a second telephone, and detects the nuisance call, includes: a memory configured to store a voice signal during the telephone call; and a processor configured to analyze the voice signal for one telephone call to calculate a plurality of pieces of determination information used for determination as to whether the telephone call is a nuisance call, simultaneously calculate information on a length of a conversation for the one telephone call, further calculate each weighting factor of the plurality of pieces of determination information in accordance with a length of the conversation, then calculate a nuisance call evaluation value based on a value obtained by multiplying each of the plurality of pieces of determination information by the weighting factor, and determine based on the nuisance call evaluation value whether the telephone call is a nuisance call.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 1 is a block diagram illustrating a functional configuration of a nuisance call detection device according to a first embodiment.

FIG. 2 is a flowchart illustrating a nuisance call detection process according to the first embodiment.

FIG. 5B is a diagram illustrating a configuration of a nuisance call evaluation value calculation unit in the nuisance call detection device according to the second embodiment.

FIG. 6A is a flowchart (part 1) illustrating a nuisance call detection process according to the second embodiment.

FIG. 12 is a diagram illustrating an example of a neural network.

FIG. 19 is a graph chart illustrating an example of a method for learning a second weighting function.

FIG. 20B is a diagram illustrating a configuration of a keyword weight setting unit in the nuisance call detection system according to the seventh embodiment.

FIG. 21 is a diagram illustrating an example of a weighted keyword list.

FIG. 23 is a block diagram illustrating a hardware configuration of a computer.

DESCRIPTION OF EMBODIMENTS

Figure 3A:
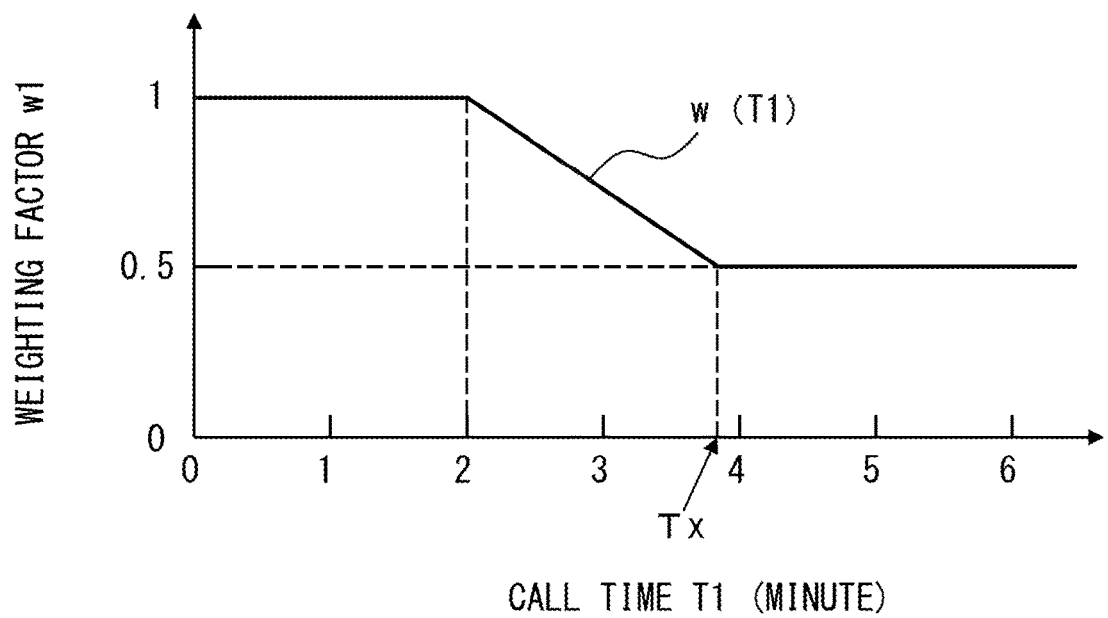
FIG. 3A is a graph chart illustrating an example of a method for calculating a weighting factor.

In a nuisance call, a person that receives a telephone call may quickly at that point in time hang up the telephone (break the connection) when it is noticed that it is a nuisance call, and therefore a call time is short. Further, even if the call time is long, when a person that receives the telephone call remains silent for a long time, voice information usable in analysis may be lacking. Therefore, when the call time is short or a ratio of a voice section for the whole call time (total voice section length) is small, information used for determination as to whether a telephone call is a nuisance call is lacking and erroneous determination increases.

Preferred embodiments of the present invention will be explained with reference to accompanying drawings.

First Embodiment

FIG. 1 is a block diagram illustrating a functional configuration of a nuisance call detection device according to the first embodiment.

As illustrated in FIG. 1, the nuisance call detection device 1 of the present embodiment includes a frame processing unit 100, a determination information calculation unit 110, a conversation amount calculation unit 120, a weight calculation unit 130, a nuisance call evaluation value calculation unit 140, and a nuisance call determination unit 150.

The frame processing unit 100 divides input speech (call speech) into frames, which are process units of voice signals, and converts each frame from a signal in a time domain to a signal in a frequency domain.

The determination information calculation unit 110 analyzes the framed voice signal and calculates a plurality of pieces of determination information used for a determination as to whether a telephone call is a nuisance call. For the determination information, for example, a stress evaluation value of a speaker during a telephone call, the number of predetermined detected keywords, the frequency of supportive responses, a speaking ratio, or the like is usable. Here, the stress evaluation value is a value representing how much stress a speaker may be feeling.

The conversation amount calculation unit 120 calculates information (conversation amount) on a length of conversation in input speech.

Based on the conversation amount calculated by the conversation amount calculation unit 120, the weight calculation unit 130 calculates a weight (level of importance) of the plurality of pieces of determination information used for a determination as to whether the telephone call is a nuisance call.

The nuisance call evaluation value calculation unit 140 calculates a nuisance call evaluation value representing a nuisance call likelihood by using the plurality of pieces of determination information calculated by the determination information calculation unit 110 and the weight calculated by the weight calculation unit 130.

Based on the nuisance call evaluation value, the nuisance call determination unit 150 determines whether the telephone call is a nuisance call. If it is determined that the telephone call is a nuisance call, the nuisance call determination unit 150 outputs information indicating that the telephone call is a nuisance call.

This nuisance call detection device 1 is, for example, built into a mobile telephone. When in response to an establishment request for a connection from another telephone, the connection is established and a telephone call is started, the mobile telephone in which the nuisance call detection device 1 is built determines based on call speech whether a telephone call from the another telephone is a nuisance call.

Hereinafter, a nuisance call detection process that is performed by the nuisance call detection device 1 of the present embodiment will be explained with reference to FIG. 2. In the following descriptions, a telephone on the side in which the nuisance call is received is called a first telephone, and a telephone that transmits an establishment request for the connection to the first telephone is called a second telephone.

FIG. 2 is a flowchart illustrating the nuisance call detection process according to the first embodiment.

When a telephone call is started in response to a request from the second telephone, the nuisance call detection device 1 first starts reception of an input of call speech as illustrated in FIG. 2 (step S100). The process of step S100 is performed by the frame processing unit 100.

After the reception of an input of the call speech is started, the frame processing unit 100 performs frame processing of the input call speech (input speech) (step S101). In step S101, for example, the frame processing unit 100 divides an input speech signal into a plurality of frame signals for each predetermined time, and converts each frame signal from a signal in the time domain to a signal in the frequency domain. The frame processing unit 100 outputs a frame signal after the frame processing to the determination information calculation unit 110.

When a frame signal after the frame processing is input, the determination information calculation unit 110 calculates and accumulates the first determination information and the second determination information using the input frame signal (step S102). As the first determination information, for example, the determination information calculation unit 110 calculates the stress evaluation value representing whether a user of the first telephone may feel stress. Further, as the second determination information, for example, the determination information calculation unit 110 calculates the number of the predetermined detected keywords.

Next, the nuisance call detection device 1 determines whether the telephone call has been completed (step S103). The determination of step S103 is performed, for example, by the frame processing unit 100. For example, when the frame processing is performed up to end of the input speech signal in one telephone call, the frame processing unit 100 determines that the telephone call has been completed. If the frame processing is not performed up to end of the input speech signal in the one telephone call (step S103; No), the frame processing unit 100 determines that the telephone call is continuing, and the process of steps S101 and S102 is continued.

On the other hand, if the frame processing is performed up to the end of the input speech signal in one telephone call (step S103; Yes), the frame processing unit 100 outputs to the determination information calculation unit 110 a signal indicating that the telephone call has been completed.

When the telephone call has been completed, the nuisance call detection device 1 then calculates the conversation amount of a target telephone call (step S104). The process of step S104 is performed by the conversation amount calculation unit 120. For example, the conversation amount calculation unit 120 acquires information on a call time, a voice section, or the like of one telephone call from the determination information calculation unit 110, and calculates information (conversation amount) on a length of the conversation. The conversation amount calculation unit 120 outputs the calculated conversation amount to the weight calculation unit 130.

When the conversation amount is input, the weight calculation unit 130 calculates a weighting factor corresponding to the determination information based on the input conversation amount (step S105). The weight calculation unit 130 calculates the weighting factor corresponding to the determination information, for example, based on a weighting function by using as a parameter a length of the call time. The weight calculation unit 130 outputs the calculated weighting factor to the nuisance call evaluation value calculation unit 140.

When the weighting factor is input, the nuisance call evaluation value calculation unit 140 calculates nuisance call evaluation values using the first determination information, the second determination information, and the weighting factors (step S106). The nuisance call evaluation value calculation unit 140 calculates a nuisance call evaluation value EVN using the weighting factor, for example, from the following formula (1).

$$EVN = w*JI1 + (1-w)*JI2 \quad (1)$$

In formula (1), JI1 denotes the first determination information and JI2 denotes the second determination information.

The nuisance call evaluation value calculation unit 140 outputs the calculated nuisance call evaluation values to the nuisance call determination unit 150.

When the nuisance call evaluation values are input, the nuisance call determination unit 150 determines whether the nuisance call evaluation value is equal to or greater than a threshold (step S107). If the nuisance call evaluation value is less than the threshold (step S107; No), the nuisance call determination unit 150 determines that the target telephone call is not a nuisance call. Thereby, the nuisance call detection device 1 completes the nuisance call detection process without performing a response to the nuisance call.

On the other hand, if the nuisance call evaluation value is equal to or greater than the threshold (step S107; Yes), the nuisance call determination unit 150 determines that the target telephone call is a nuisance call and outputs nuisance call information (step S108). For example, the nuisance call determination unit 150 outputs information including a telephone number of the second telephone. When the nuisance call detection device 1 is built into the first telephone that receives a telephone call (nuisance call) from the second telephone, the nuisance call information output from the nuisance call detection device 1 is displayed, for example, on a display of the first telephone.

FIG. 3A is a graph chart illustrating an example of a method for calculating a weighting factor. Further, FIG. 3B is a graph chart illustrating another example of a method for calculating a weighting factor.

For a weighting function used in calculating a weighting factor w, for example, a function w1=w(T1) can be used in which a weighting factor w1 changes depending on a call time T1, as illustrated in FIG. 3A. In w1=w(T1) illustrated in FIG. 3A, when the call time T1 is equal to or less than two minutes, w1=1 holds, and when the call time T1 is equal to or greater than Tx minutes (Tx>2), w1=0.5 holds. Therefore, when the weighting factor w of formula (1) is set to w=w1, as the call time T1 is shorter, a degree of contribution of the first determination information to the nuisance call evaluation value becomes larger. Therefore, when the weighting factor w1 is calculated based on the weighting function w(T1), the first determination information is decided based on call trends in the case in which the call time T1 is short with respect to the nuisance call, and the second determination information is decided based on call trends in the case in which the call time T1 is long with respect to the nuisance call. In the nuisance call detection device 1, the process permits the proper nuisance call evaluation value EVN to be calculated depending on the call time T1. Therefore, it is possible for the nuisance call detection device 1 to determine with a high accuracy whether the telephone call is a nuisance call even if the call time T1 is short.

Figure 3B:
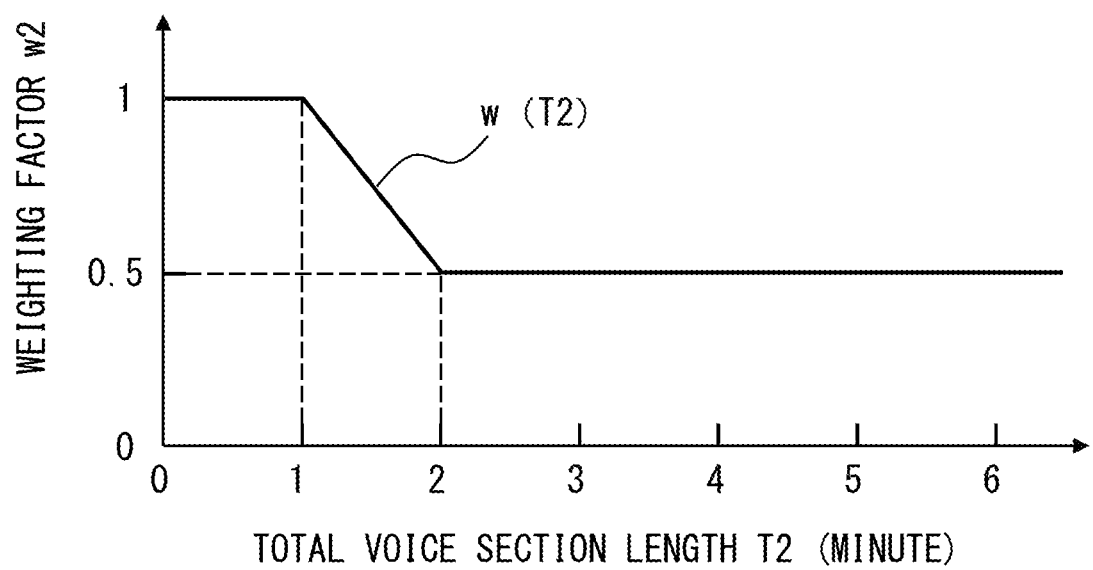
FIG. 3B is a graph chart illustrating another example of a method for calculating a weighting factor.

Further, for a weighting function used in calculating the weighting factor w, for example, a function w2=w(T2) can be used in which a weighting factor w2 changes depending on a total voice section length T2, as illustrated in FIG. 3B. Here, the total voice section length T2 is a sum of time lengths of voice sections in the input speech signal of one telephone call. In w2=w(T2) illustrated in FIG. 3B, when the total voice section length T2 is equal to or less than one minute, w2=1 holds, and when the total voice section length T2 is equal to or greater than two minutes, w2=0.5 holds. Therefore, also when the weighting factor w of formula (1) is set to w=w2, as the total voice section length T2 is shorter, a degree of contribution of the first determination information to the nuisance call evaluation value EVN becomes larger. Therefore, when the weighting factor w2 is calculated based on the weighting function w(T2), the first determination information is determined based on call trends in the case in which the total voice section length T2 is short with respect to the nuisance call, and the second determination information is determined based on call trends in the case in which the total voice section length T2 is long with respect to the nuisance call. In the nuisance call detection device 1, the process permits the proper nuisance call evaluation value EVN to be calculated depending on the total voice section length T2. Therefore, it is possible for the nuisance call detection device 1 to determine with a high accuracy whether the telephone call is a nuisance call even if the total voice section length T2 is short.

Further, in the nuisance call detection device 1 of the present embodiment, in the case of calculating the weighting factor w, a larger weighting factor may be selected between the weighting factor w1 that is calculated based on the call time T1 and the weighting factor w2 that is calculated based on the total voice section length T2.

Figure 4:
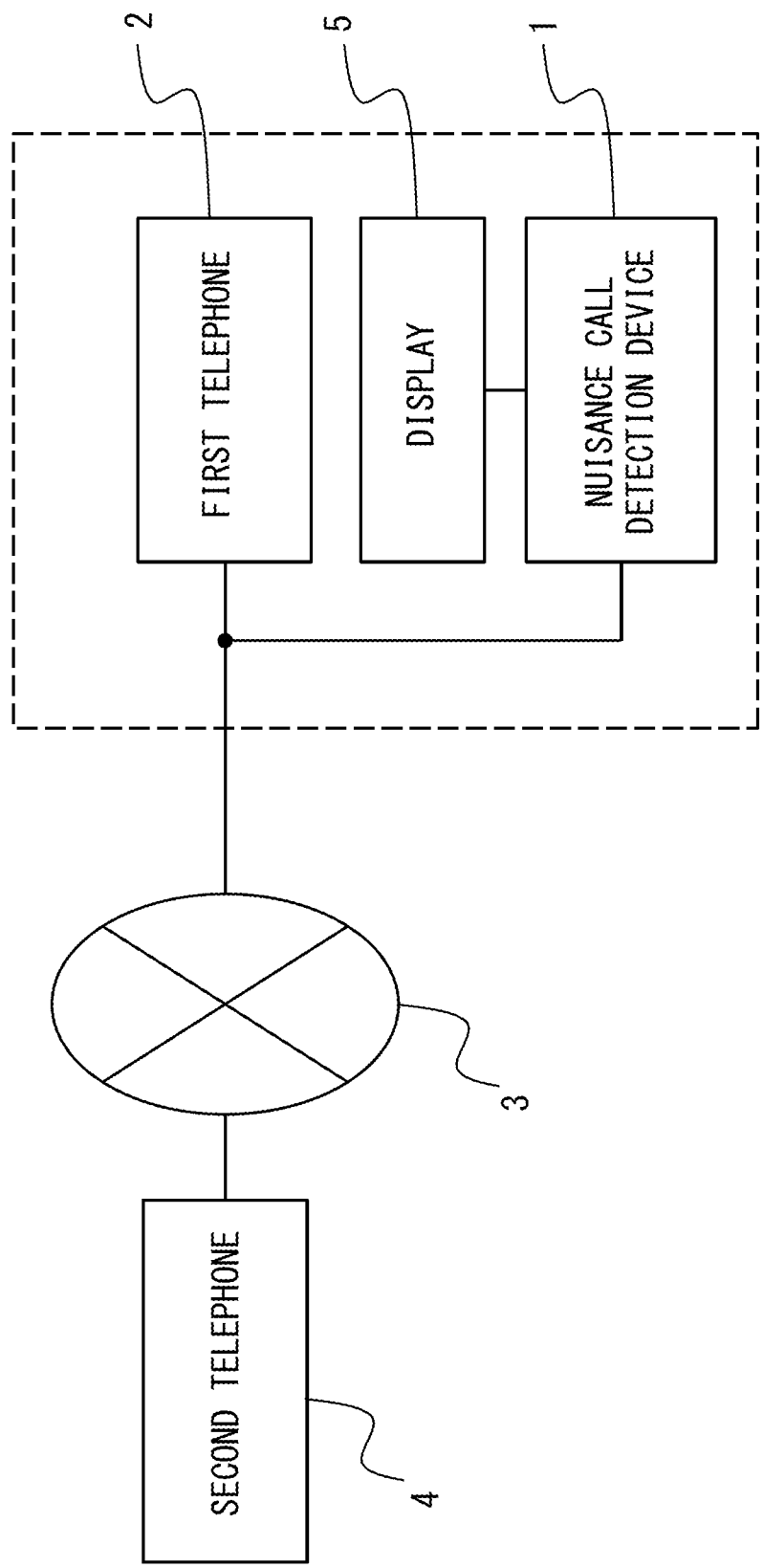
FIG. 4 is a diagram illustrating an installation example of the nuisance call detection device.

Further, the nuisance call detection device 1 of the present embodiment is not limited to that which is built into a mobile phone as described above. As illustrated in FIG. 4, for example, the nuisance call detection device 1 may be a separate body from a telephone. FIG. 4 is a diagram illustrating an installation example of the nuisance call detection device.

In FIG. 4, the first telephone 2 establishes a connection with the second telephone 4 via a telephone network 3 and enables a telephone call between a user of the first telephone 2 and that of the second telephone 4. Further, for example, the first telephone 2 establishes a connection with the second telephone 4 via an IP network in place of the telephone network 3 and may enable a telephone call in which the two telephones 2 and 4 are used.

When the user of the first telephone 2 uses the nuisance call detection device 1, for example, the nuisance call detection device 1 is installed in the vicinity of the first telephone 2. On this occasion, for example, a component for monitoring such as a branching device (not illustrated) is attached to a telephone cable for connecting the first telephone 2 and the telephone network 3, and the component and an input unit (frame processing unit 100) of the nuisance call detection device 1 are connected.

Further, a display 5 is connected to an output unit (nuisance call determination unit 150) of the nuisance call detection device 1. Thereby, when a telephone call from the second telephone 4 is a nuisance call, the fact that it is a nuisance call can be displayed on the display 5 and can be reported to the user of the first telephone 2.

A flowchart of FIG. 2 is an example of the nuisance call detection process according to the present embodiment. In the nuisance call detection process according to the present embodiment, for example, call speech is recorded and the frame processing (step S101) of input speech or a process (step S102) for calculating the first determination information and the second determination information may be performed after completion of the telephone call. Further, in the nuisance call detection process according to the present embodiment, the nuisance call evaluation value may be calculated during the telephone call and the determination as to whether the telephone call is a nuisance call may be performed.

Second Embodiment

Figure 5A:
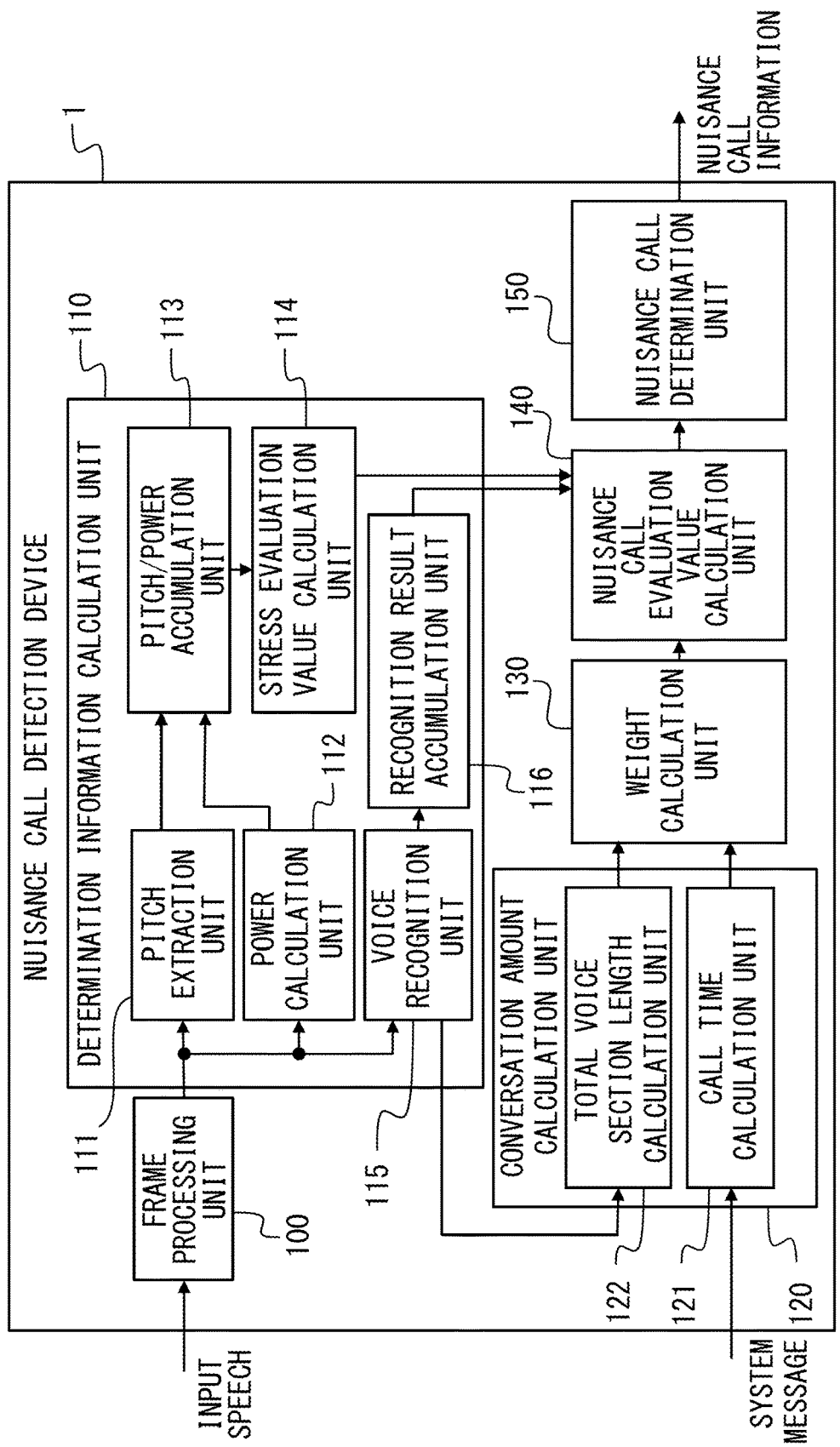
FIG. 5A is a block diagram illustrating a functional configuration of a nuisance call detection device according to a second embodiment.

FIG. 5A is a block diagram illustrating a functional configuration of a nuisance call detection device according to the second embodiment. FIG. 5B is a diagram illustrating a configuration of a nuisance call evaluation value calculation unit in the nuisance call detection device according to the second embodiment.

As illustrated in FIG. 5A, the nuisance call detection device 1 of the present embodiment includes the frame processing unit 100, the determination information calculation unit 110, the conversation amount calculation unit 120, the weight calculation unit 130, the nuisance call evaluation value calculation unit 140, and the nuisance call determination unit 150.

The frame processing unit 100 divides input speech (call speech) into a frame that is a process unit of a voice signal, and converts each frame from a signal in a time domain to a signal in a frequency domain.

The determination information calculation unit 110 analyzes the framed voice signal and calculates a plurality of pieces of determination information used for a determination as to whether a telephone call is a nuisance call. The determination information calculation unit 110 of the present embodiment includes a pitch extraction unit 111, a power calculation unit 112, a pitch/power accumulation unit 113, a stress evaluation value calculation unit 114, a voice recognition unit 115, and a recognition result accumulation unit 116.

The pitch extraction unit 111 extracts a pitch of a frame signal. The power calculation unit 112 calculates a power of the frame signal. The pitch/power accumulation unit 113 accumulates the extracted pitch and the calculated power. The stress evaluation value calculation unit 114 calculates a stress evaluation value indicating how much a speaker may feel stress, based on the pitch and power of the accumulated frame signals. The voice recognition unit 115 detects a predetermined keyword included in a voice signal by known voice recognition. The recognition result accumulation unit 116 accumulates the number of detected keywords for each keyword in the voice recognition unit 115.

The conversation amount calculation unit 120 calculates information (conversation amount) on a length of conversation in input speech. The conversation amount calculation unit 120 of the present embodiment includes a call time calculation unit 121 and a total voice section length calculation unit 122. The call time calculation unit 121 calculates the call time T1, for example, based on information on a time in which each of broadcast system messages at call start and at call completion is received from the outside of the nuisance call detection device 1. Based on recognition results of the voice recognition unit 115, the total voice section length calculation unit 122 calculates a sum of time lengths of the voice sections detected from one telephone call.

Based on the conversation amount calculated by the conversation amount calculation unit 120, the weight calculation unit 130 calculates weights corresponding to the plurality of pieces of determination information used for a determination as to whether a telephone call is a nuisance call. The weight calculation unit 130 of the present embodiment adopts a larger weighting factor between the weighting factor w1 calculated based on the call time T1 and the weighting factor w2 calculated based on the total voice section length T2.

The nuisance call evaluation value calculation unit 140 calculates a nuisance call evaluation value representing a nuisance call likelihood by using the plurality of pieces of determination information calculated by the determination information calculation unit 110 and the weights calculated by the weight calculation unit 130. The nuisance call evaluation value calculation unit 140 of the present embodiment includes a keyword evaluation value calculation unit 141 and an evaluation value summation unit 142, as illustrated in FIG. 5B.

The keyword evaluation value calculation unit 141 calculates a keyword evaluation value based on the recognition results (the number of the detected keywords) read out from the recognition result accumulation unit 116 of the determination information calculation unit 110. The keyword evaluation value is set to, for example, a value obtained by multiplying the number of the detected keywords by a predetermined constant. The evaluation value summation unit 142 adds the keyword evaluation value and the stress evaluation value calculated by the stress evaluation value calculation unit 114 by using the weighting factor w calculated by the weight calculation unit 130, and calculates the nuisance call evaluation value.

The nuisance call determination unit 150 determines whether the telephone call is a nuisance call, based on the nuisance call evaluation value. If it is determined that the telephone call is a nuisance call, the nuisance call determination unit 150 outputs information indicating that the telephone call is a nuisance call.

The nuisance call detection device 1 of the present embodiment may be built into a telephone or may be a body separated from a telephone in the same manner as in the first embodiment.

Hereinafter, a nuisance call detection process that is performed by the nuisance call detection device 1 of the present embodiment will be explained with reference to FIGS. 6A and 6B. In the following descriptions, a telephone on the side in which the nuisance call is received is called a first telephone, and a telephone that transmits an establishment request for the connection to the first telephone is called a second telephone.

Figure 6B:
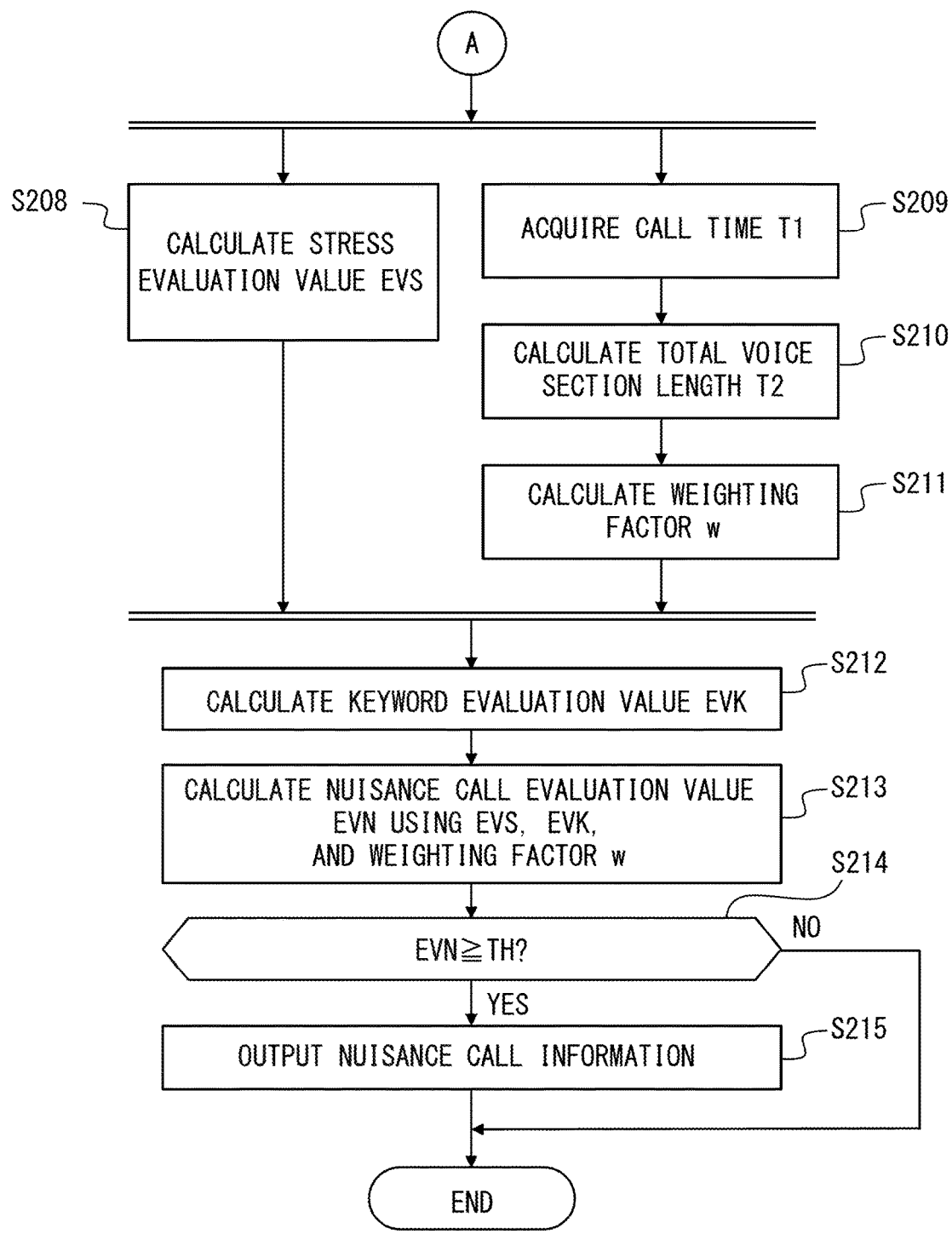
FIG. 6B is a flowchart (part 2) illustrating the nuisance call detection process according to the second embodiment.

FIG. 6A is a flowchart (part 1) illustrating the nuisance call detection process according to the second embodiment. FIG. 6B is a flowchart (part 2) illustrating the nuisance call detection process according to the second embodiment.

When a telephone call is started in response to a request from the second telephone, the nuisance call detection device 1 first starts reception of an input of call speech as illustrated in FIG. 6A (step S200). The process of step S200 is performed by the frame processing unit 100.

After the reception of an input of the call speech is started, the frame processing unit 100 performs frame processing of the input call speech (input speech) (step S201). In step S201, for example, the frame processing unit 100 divides an input speech signal into a plurality of frame signals for each predetermined time, and converts each frame signal from a signal in the time domain to a signal in the frequency domain. The frame processing unit 100 outputs a frame signal after the frame processing to the determination information calculation unit 110.

When the frame signal is input after the frame processing, the determination information calculation unit 110 performs the process of steps S202 to S206 using the input frame signals. The determination information calculation unit 110 first performs a process (step S202) for extracting and accumulating pitch from the input frame signals and a process (step S203) for calculating and accumulating power from the input frame signals. The process of step S202 is performed by the pitch extraction unit 111 and that of step S203 is performed by the power calculation unit 112. The pitch extraction unit 111 extracts pitch from the frame signals (voice signals) using a known extraction method and accumulates the extracted pitch in the pitch/power accumulation unit 113. The power calculation unit 112 calculates power from the frame signal using a known calculation method and accumulates the calculated power in the pitch/power accumulation unit 113. In steps S202 and S203, an order of the process may be reversed, and they may be performed in parallel.

Further, the determination information calculation unit 110 performs a voice recognition process (step S204), a process (step S205) for accumulating keywords, and a process (step S206) for accumulating detection results of voice sections in parallel with the process of steps S202 and S203. The process of steps S204 to S206 is performed by the voice recognition unit 115. The voice recognition unit 115 first detects a predetermined keyword from the input frame signal (voice signal) using the known voice recognition process. Next, the voice recognition unit 115 accumulates the number of the detected keywords for each keyword in the recognition result accumulation unit 116. Further, the voice recognition unit 115 accumulates information on a time of the voice section detected from the voice signals in the recognition result accumulation unit 116, and at the same time, outputs the above information to the total voice section length calculation unit 122 of the conversation amount calculation unit 120. The process of steps S204 to S206 may be performed before or after the process of steps S202 and S203 instead of performing the above process in parallel with the process of steps S202 and S203.

After the process of steps S202 to S206, the nuisance call detection device 1 determines whether the telephone call has been completed (step S207). For example, the determination of step S207 is performed by the frame processing unit 100. For example, if the frame processing is performed up to the end of the input speech signals in one telephone call, the frame processing unit 100 determines that the telephone call has been completed. If the frame processing is not performed up to the end of the input speech signal in one telephone call (step S207; No), the frame processing unit 100 determines that the telephone call is continuing, and the process of steps S201 and steps S202 to S206 is continued.

On the other hand, if the frame processing is performed up to end of the input speech signal in one telephone call (step S207; Yes), the frame processing unit 100 outputs to the determination information calculation unit 110 a signal indicating that the telephone call has been completed.

As illustrated in FIG. 6B, when the telephone call has been completed, the nuisance call detection device 1 then performs the process of step S208 and steps S209 to S211. The process of step S208 is performed by the determination information calculation unit 110 and the process of steps S209 to S211 is performed by the conversation amount calculation unit 120 and the weight calculation unit 130.

When a signal is input indicating that the telephone call has been completed, the determination information calculation unit 110 calculates the stress evaluation value EVS using the stress evaluation value calculation unit 114 (step S208). The stress evaluation value calculation unit 114 calculates the stress evaluation value EVS using a known calculation method using the pitch and power accumulated in the pitch/power accumulation unit 113.

Further, in the nuisance call detection device 1, a process (step S209) for acquiring the call time T1, a process (step S210) for calculating the total voice section length T2, and a process (step S211) for calculating the weighting factor w are performed in parallel with the process of step S208. The process of step S209 is performed by the call time calculation unit 121 of the conversation amount calculation unit 120, and the process of step S210 is performed by the total voice section length calculation unit 122 of the conversation amount calculation unit 120. Further, the process of step S211 is performed by the weight calculation unit 130. The call time calculation unit 121 acquires (calculates) the call time T1, for example, based on the system message from the control unit of the telephone. The total voice section length calculation unit 122 calculates the total voice section length T2 that is a sum of the voice sections in one telephone call, based on results of the voice recognition input from the voice recognition unit 115 or results of the voice recognition accumulated in the recognition result accumulation unit 116. The weight calculation unit 130 determines a larger weighting factor as the weighting factor w used for calculation of the nuisance call evaluation value between the weighting factor w1 set based on the call time T1 and the weighting factor w2 set based on the total voice section length T2. In other words, using the following formula (2), the weight calculation unit 130 calculates the weighting factor w used for the calculation of the nuisance call evaluation value.

$$w=\max\{w1,w2\} \quad (2)$$

The weight calculation unit 130 outputs the calculated weighting factor w to the nuisance call evaluation value calculation unit 140.

As a result of the voice recognition, when the stress evaluation value EVS and the weighting factor w are input, the nuisance call evaluation value calculation unit 140 first calculates the keyword evaluation value EVK (step S212). The process of step S212 is performed by the keyword evaluation value calculation unit 141. For example, the keyword evaluation value calculation unit 141 calculates the number of the detected keywords for each keyword based on the results of the voice recognition and sets as the keyword evaluation value EVK a value obtained by multiplying the number of the detected keywords for each keyword by the predetermined constant.

When the keyword evaluation value EVK is calculated, the nuisance call evaluation value calculation unit 140 then calculates the nuisance call evaluation value EVN by using the keyword evaluation value EVK, the stress evaluation value EVS, and the weighting factor w (step S213). The process of step S213 is performed by the evaluation value summation unit 142. The evaluation value summation unit 142 calculates the nuisance call evaluation value EVN, for example, using the following formula (3).

$$EVN=w*EVN+(1-w)*EVS \quad (3)$$

The nuisance call evaluation value calculation unit 140 outputs the calculated nuisance call evaluation value EVN to the nuisance call determination unit 150.

When the nuisance call evaluation value EVN is input, the nuisance call determination unit 150 determines whether the nuisance call evaluation value EVN is equal to or greater than the threshold TH (step S214). If the nuisance call evaluation value EVN is less than the threshold TH (step S214; No), the nuisance call determination unit 150 determines that a target telephone call is not a nuisance call. Thereby, the nuisance call detection device 1 completes the nuisance call detection process without responding to the nuisance call.

On the other hand, if the nuisance call evaluation value EVN is equal to or greater than the threshold TH (step S214; Yes), the nuisance call determination unit 150 determines that the target telephone call is a nuisance call and outputs the nuisance call information (step S215). For example, the nuisance call determination unit 150 outputs information including a telephone number of the second telephone. When the nuisance call detection device 1 is built into the first telephone that receives a telephone call (nuisance call) from the second telephone, the nuisance call information output from the nuisance call detection device 1 is displayed, for example, on a display of the first telephone.

As described above, in the present embodiment, the keyword evaluation value EVK and the stress evaluation value EVS are used as a plurality of pieces of determination information for determining whether the target telephone call is a nuisance call. Further, in the present embodiment, the call time T1 or the total voice section length T2 is lengthened and the weighting factor w is reduced, so that a contribution rate of the keyword evaluation value EVK to the nuisance call evaluation value is decreased and the contribution rate of the stress evaluation value EVS to the nuisance call evaluation value is increased. That is, in the nuisance call detection method according to the present embodiment, when the call time T1 or the total voice section length T2 is lengthened, the nuisance call evaluation value is calculated using the tendency for a level of stress of a speaker receiving a nuisance call to increase. Consequently, according to the present embodiment, it is possible to calculate the proper nuisance call evaluation value EVN corresponding to a length of the call time T1 or that of the total voice section length T2. Therefore, according to the present embodiment, it is possible to determine with a higher accuracy whether the target telephone call is a nuisance call even if the call time T1 or the total voice section length T2 is short.

Further, the flowcharts of FIGS. 6A and 6B are an example of a nuisance call detection process according to the present embodiment. In the nuisance call detection process according to the present embodiment, for example, call speech may be recorded and the process of steps S201 to S206 may be performed after completion of the telephone call. Further, in the nuisance call detection process according to the present embodiment, the nuisance call evaluation value may be calculated during the telephone call and the determination as to whether the target telephone call is a nuisance call may be performed.

Third Embodiment

In the present embodiment, a length of the call time T1 or that of the total voice section length T2 has also been considered in calculating the keyword evaluation value in the nuisance call detection process of the second embodiment, and thereby an example will be explained in which it is possible to calculate a proper nuisance call evaluation value.

Figure 7:
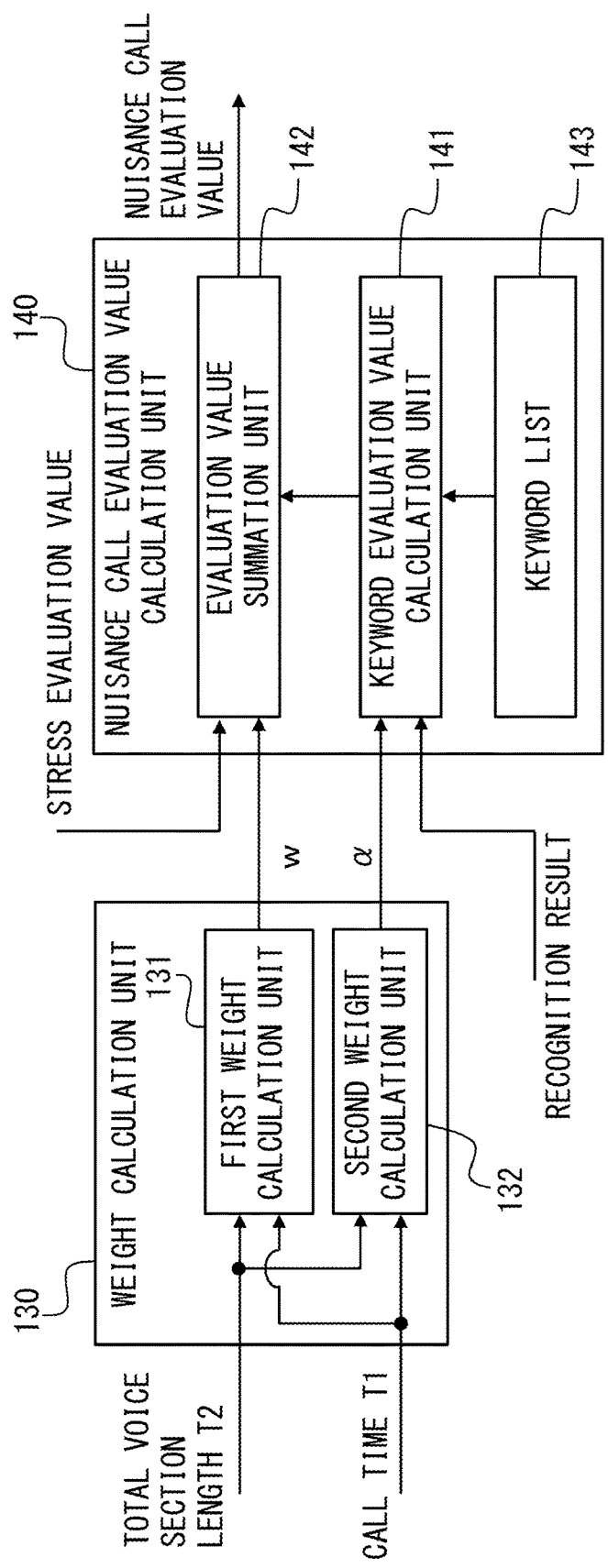
FIG. 7 is a diagram illustrating configurations of a weight calculation unit and a nuisance call evaluation value calculation unit in a nuisance call detection device according to a third embodiment.

FIG. 7 is a diagram illustrating a configuration of a weight calculation unit and that of a nuisance call evaluation value calculation unit in a nuisance call detection device according to the third embodiment.

As illustrated in FIG. 5A, the nuisance call detection device 1 of the present embodiment includes the frame processing unit 100, the determination information calculation unit 110, the conversation amount calculation unit 120, the weight calculation unit 130, the nuisance call evaluation value calculation unit 140, and the nuisance call determination unit 150. The frame processing unit 100, the determination information calculation unit 110, the conversation amount calculation unit 120, and the nuisance call determination unit 150 in the nuisance call detection device 1 of the present embodiment are as explained in the second embodiment.

As illustrated in FIG. 7, the weight calculation unit 130 in the nuisance call detection device 1 of the present embodiment includes a first weight calculation unit 131 and a second weight calculation unit 132. The first weight calculation unit 131 calculates a first weighting factor w by using the call time T1 and the total voice section length T2. The second weight calculation unit 132 calculates a second weighting factor α by using the call time T1 and the total voice section length T2.

Further, the nuisance call evaluation value calculation unit 140 in the nuisance call detection device 1 of the present embodiment includes the keyword evaluation value calculation unit 141, the evaluation value summation unit 142, and a keyword list 143. The keyword evaluation value calculation unit 141 calculates the keyword evaluation value EVK by using the number of the detected keywords registered in the keyword list 143 and the second weighting factor α. Using the first weighting factor w, the evaluation value summation unit 142 adds up the stress evaluation value EVS and the keyword evaluation value EVK to thereby calculate the nuisance call evaluation value EVN.

Figure 8:
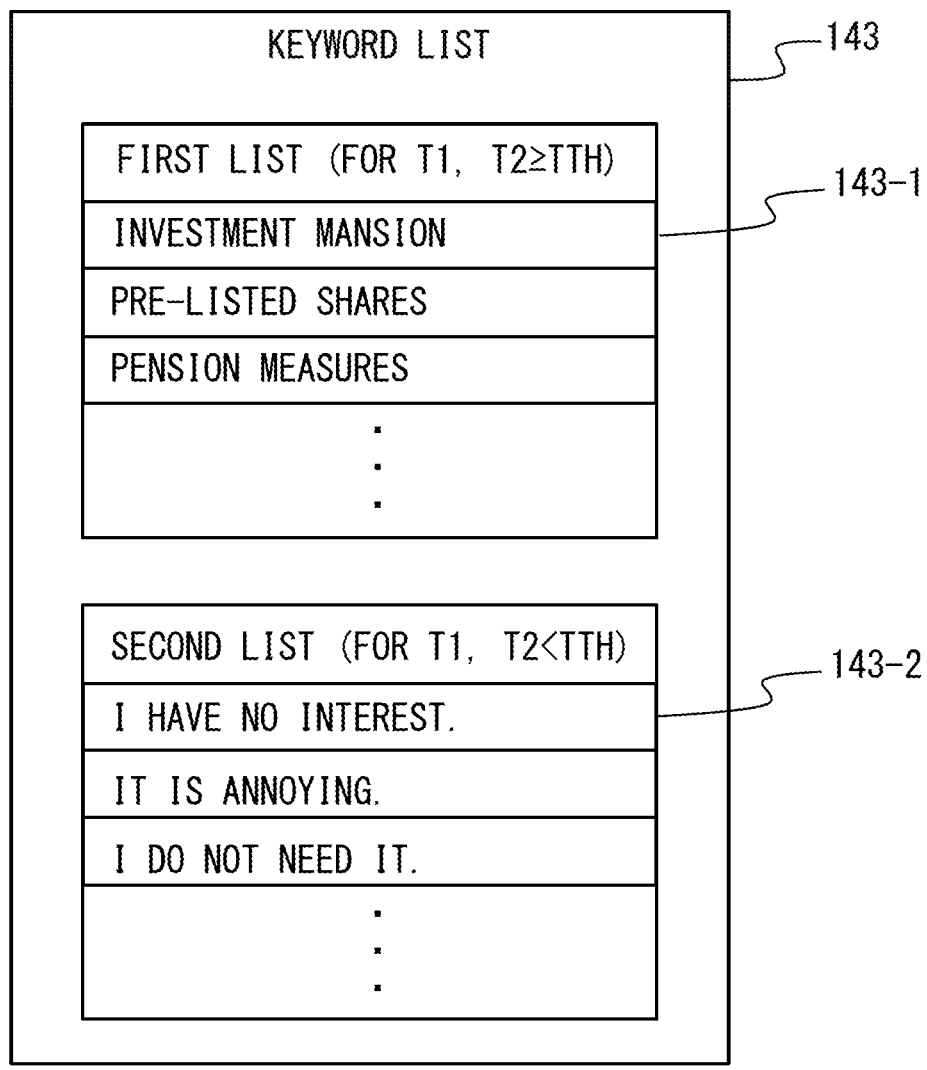
FIG. 8 is a diagram illustrating an example of a keyword list.

FIG. 8 is a diagram illustrating an example of the keyword list. As illustrated in FIG. 8, a first list 143-1 and a second list 143-2 are registered in the keyword list 143. In the first list 143-1, a plurality of keywords are registered that are prone to appear frequently in the case in which the call time T1 or the total voice section length T2 is equal to or greater than a predetermined threshold TTH. On the other hand, in the second list 143-2, a plurality of keywords are registered that are prone to appear frequently in the case in which the call time T1 or the total voice section length T2 is less than the threshold TTH.

The keyword evaluation value calculation unit 141 of the present embodiment refers to this keyword list 143 and calculates the keyword evaluation value EVK using the following formula (4).

$$EVK = \alpha \sum_j \{NK2(j) \times M2(j)\} + (1-\alpha) \sum_i \{NK1(i) \times M1(i)\} \quad (4)$$

NK1(*i*) and NK2(*j*) of formula (4) denote the number of the detected keywords of an i-th keyword in the first list 143-1 and the number of the detected keywords of a j-th keyword in the second list 143-2, respectively. Further, M1(*i*) and M2(*j*) of formula (4) denote a constant by which the i-th keyword in the first list 143-1 is multiplied and a constant by which the j-th keyword in the second list 143-2 is multiplied, respectively.

In the second weight calculation unit 132, α of formula (4) is a second weight calculated by the following formula (5).

$$\alpha = \max\{\alpha(T1), \alpha(T2)\} \quad (5)$$

Figure 9:
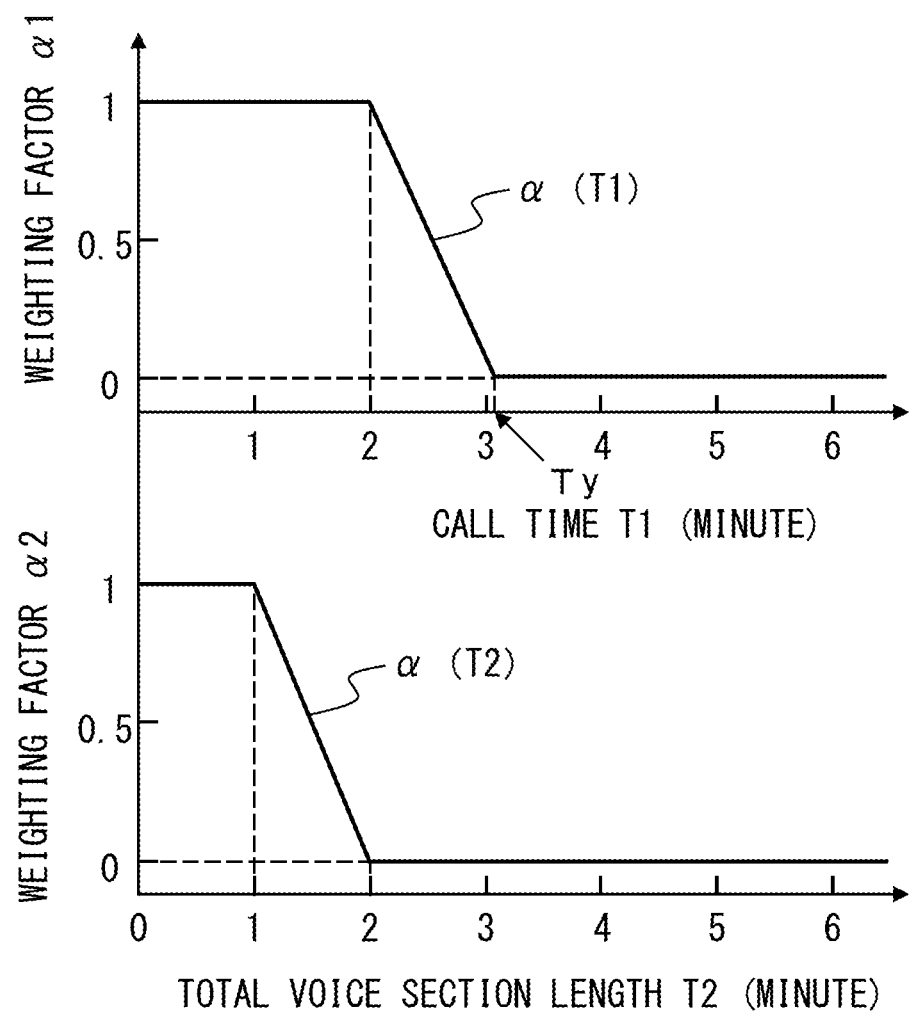
FIG. 9 is a graph chart illustrating a method for calculating a second weighting factor.

Further, α(T1) and α(T2) of formula (5) denote the second weighting factor αt the time of the call time T1 and the second weighting factor αt the time of the total voice section length T2, calculated using the weighting function illustrated in FIG. 9, respectively. FIG. 9 is a graph chart illustrating a method for calculating the second weighting factor.

Further, in two graphs illustrated in FIG. 9, a graph on the upper side is a graph illustrating a relationship between the call time T1 and the weighting factor α1, and a graph on the lower side is a graph illustrating a relationship between the total voice section length T2 and the weighting factor α2.

In α1=α(T1) illustrated at the upper side of FIG. 9, when the call time T1 is equal to or less than two minutes, α1=1 holds, whereas when the call time T1 is equal to or greater than Ty minutes (Ty>2), α1=0 holds. Therefore, when the weighting factor α of formula (4) is set as α=α1, as the call time T1 is shorter, a contribution degree of the keyword that appears on the second list 143-2 to the keyword evaluation value is larger. In the same way, in α2=α(T2) illustrated at the lower side of FIG. 9, when the total voice section length T2 is equal to or less than one minute, α2=1 holds, whereas when the total voice section length T2 is equal to or greater than two minutes, α2=0 holds. Therefore, when the keyword evaluation value EVK is calculated by formula (4), as the total voice section length T2 is shorter, the contribution degree of the keyword that appears on the second list 143-2 to the keyword evaluation value is larger. Consequently, according to the present embodiment, when the keyword evaluation value is calculated, the evaluation value can be calculated corresponding to a length of the call time T1 or that of the total voice section length T2. Thereby, in the nuisance call detection device 1 of the present embodiment, the nuisance call evaluation value obtained by adding the keyword evaluation value and the stress evaluation value can be set to a proper value. Therefore, even if the call time T1 or the total voice section length T2 is short, the nuisance call detection device 1 can determine with a higher accuracy whether the target telephone call is a nuisance call.

Figure 10:
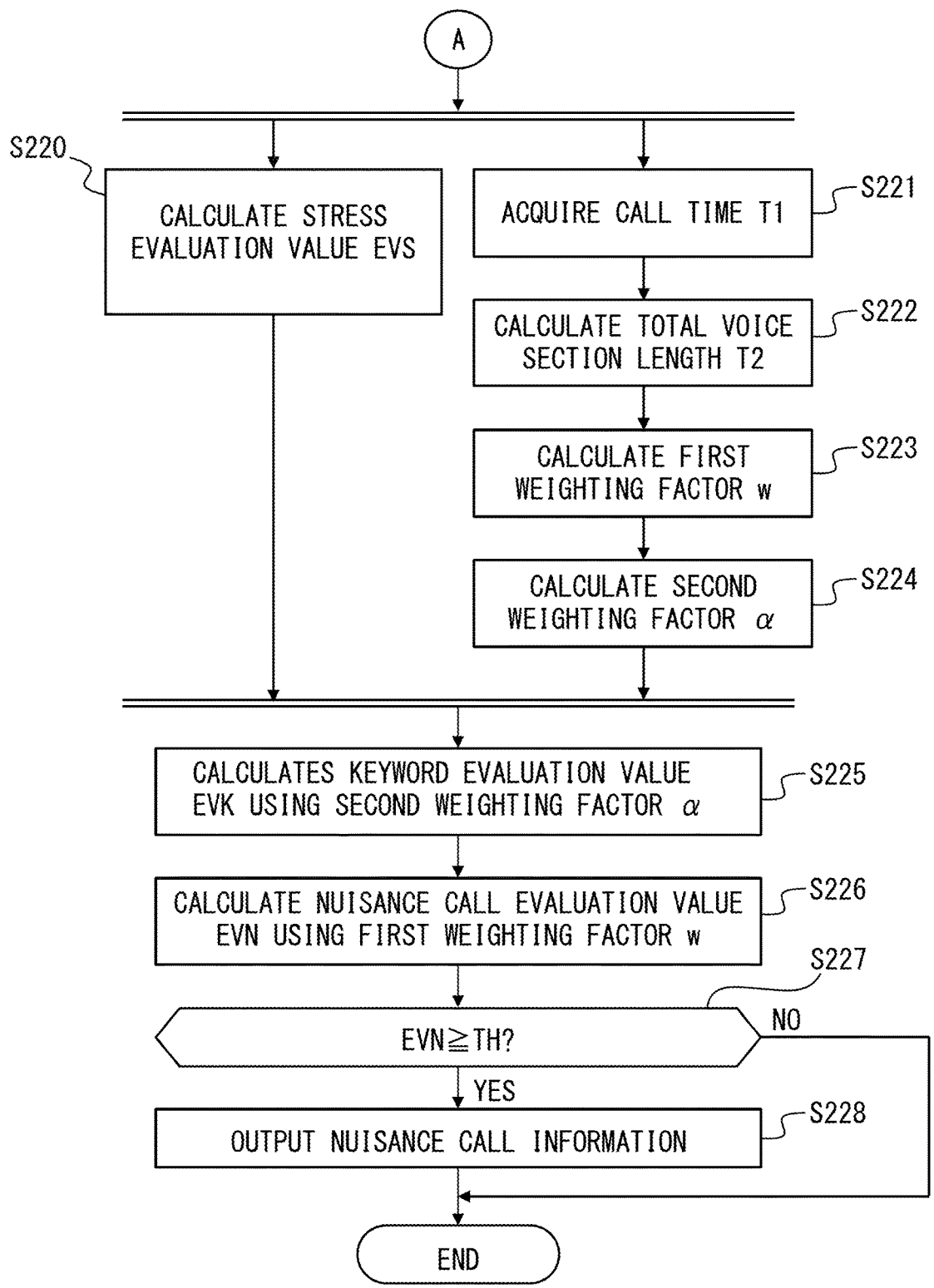
FIG. 10 is a flowchart illustrating part of a nuisance call detection process according to the third embodiment.

FIG. 10 is a flowchart illustrating part of the nuisance call detection process according to the third embodiment.

In the nuisance call detection process according to the present embodiment, when the telephone call is started in response to a request from the second telephone, the nuisance call detection device 1 performs the process of steps S200 to S207 illustrated in FIG. 6A until the telephone call has been completed. As illustrated in FIG. 10, when the telephone call has been completed, the nuisance call detection device 1 then performs the process of step S220 and steps S221 to S224. The process of step S220 is performed by the determination information calculation unit 110, and the process of steps S221 to S224 is performed by the conversation amount calculation unit 120 and the weight calculation unit 130.

When a signal is input indicating that the telephone call has been completed, the determination information calculation unit 110 calculates the stress evaluation value EVS using the stress evaluation value calculation unit 114 (step S220). The stress evaluation value calculation unit 114 calculates the stress evaluation value using the known calculation method by using the pitch and power accumulated in the pitch/power accumulation unit 113.

Further, in the nuisance call detection device 1, a process (step S221) for acquiring the call time T1, a process (step S222) for calculating the total voice section length T2, a process (step S223) for calculating the first weighting factor w, and a process (step S224) for calculating the second weighting factor α are performed in parallel with the process of step S220. The process of step S221 is performed by the call time calculation unit 121 of the conversation amount calculation unit 120, and the process of step S222 is performed by the total voice section length calculation unit 122 of the conversation amount calculation unit 120. Further, the process of step S223 is performed by the first weight calculation unit 131 of the weight calculation unit 130 illustrated in FIG. 7 and the process of step S224 is performed by the second weight calculation unit 132 of the weight calculation unit 130. The call time calculation unit 121 acquires (calculates) the call time T1, for example, based on a system message from the control unit of the telephone. The total voice section length calculation unit 122 calculates the total voice section length T2 that is a sum of the voice sections in one telephone call, based on results of the voice recognition input from the voice recognition unit 115 or results of the voice recognition accumulated in the recognition result accumulation unit 116.

The first weight calculation unit 131 determines a larger weighting factor as the weighting factor w used for calculation of the nuisance call evaluation value between the weighting factor w1 set based on the call time T1 and the weighting factor w2 set based on the total voice section length T2. The weighting factor w1 is calculated by the weighting function illustrated in FIG. 3A and the weighting factor w2 is calculated by the weighting function illustrated in FIG. 3B.

In the same way, the second weight calculation unit 132 decides a larger weighting factor αs the weighting factor α used for calculation of the keyword evaluation value between the weighting factor α1 set based on the call time T1 and the weighting factor α2 set based on the total voice section length T2. The weighting factors α1 and α2 are calculated by the weighting function illustrated in FIG. 9.

The weight calculation unit 130 outputs the calculated weighting factors w and a to the nuisance call evaluation value calculation unit 140.

As results of the voice recognition, when the stress evaluation value EVS and the weighting factors w and α are input, the nuisance call evaluation value calculation unit 140 first calculates the keyword evaluation value EVK using the second weighting factor α (step S225). The process of step S225 is performed by the keyword evaluation value calculation unit 141. For example, the keyword evaluation value calculation unit 141 refers to the keyword list 143 and calculates the number of the detected keywords for each keyword registered in the first list 143-1 and the second list 143-2 from the results of the voice recognition. Then, the keyword evaluation value calculation unit 141 calculates the keyword evaluation value EVK with a weight corresponding to a length of the call time T1 or that of the total voice section length T2 and outputs the keyword evaluation value EVK to the evaluation value summation unit 142.

When the keyword evaluation value EVK is input, the evaluation value summation unit 142 calculates the nuisance call evaluation value EVN by using the keyword evaluation value EVK, the stress evaluation value EVS, and the first weighting factor w (step S226). In step S226, the evaluation value summation unit 142 calculates the nuisance call evaluation value EVN, for example, using the above formula (3).

The nuisance call evaluation value calculation unit 140 outputs the calculated nuisance call evaluation value to the nuisance call determination unit 150.

When the nuisance call evaluation value is input, the nuisance call determination unit 150 determines whether the nuisance call evaluation value EVN is equal to or greater than the threshold TH (step S227). If the nuisance call evaluation value EVN is less than the threshold TH (step S227; No), the nuisance call determination unit 150 determines that the target telephone call is not a nuisance call. Thereby, the nuisance call detection device 1 completes the nuisance call detection process without responding to the nuisance call.

On the other hand, when the nuisance call evaluation value EVN is equal to or greater than the threshold TH (step S227; Yes), the nuisance call determination unit 150 determines that the target telephone call is a nuisance call and outputs the nuisance call information (step S228). For example, the nuisance call determination unit 150 outputs information including a telephone number of the second telephone. When the nuisance call detection device 1 is built into the first telephone that receives a telephone call (nuisance call) from the second telephone, the nuisance call information output from the nuisance call detection device 1 is displayed, for example, on a display of the first telephone.

As described above, in the present embodiment, the keyword evaluation value EVK and the stress evaluation value EVS are used as a plurality of pieces of determination information for determining whether the target telephone call is a nuisance call. Further, in the present embodiment, the call time T1 or the total voice section length T2 is lengthened and the weighting factor w is reduced, so that the contribution rate of the keyword evaluation value EVK to the nuisance call evaluation value is decreased and the contribution rate of the stress evaluation value EVS to the nuisance call evaluation value is increased. That is, in the nuisance call detection method according to the present embodiment, when the call time T1 or the total voice section length T2 is lengthened, the nuisance call evaluation value EVN is calculated using the fact that a level of stress of a speaker receiving a nuisance call is prone to increase. Further, in the present embodiment, the keyword in calculating the keyword evaluation value is divided into two by the call time T1 or the total voice section length T2, and a weight corresponding to a length of the call time T1 or that of the total voice section length T2 is given to each keyword to thereby calculate the keyword evaluation value. Therefore, according to the present embodiment, it is possible to calculate a proper keyword evaluation value corresponding to a length of the call time T1 or that of the total voice section length T2. Consequently, according to the present embodiment, it is possible to calculate a proper nuisance call evaluation value corresponding to a length of the call time T1 or that of the total voice section length T2. Therefore, according to the present embodiment, it is possible to determine with a higher accuracy whether the target telephone call is a nuisance call even if the call time T1 or the total voice section length T2 is short.

The flowcharts illustrated in FIGS. 6A and 10 are an example of the nuisance call detection process according to the present embodiment. In the nuisance call detection process according to the present embodiment, for example, call speech may be recorded and the process of steps S201 to S206 of FIG. 6A may be performed after completion of the telephone call. Further, in the nuisance call detection process according to the present embodiment, the nuisance call evaluation value may be calculated during a telephone call and the determination as to whether the target telephone call is a nuisance call may be performed.

Fourth Embodiment

In the present embodiment, a nuisance call detection device that calculates a nuisance call evaluation value using a neural network and a detection method therefor will be explained.

Figure 11:
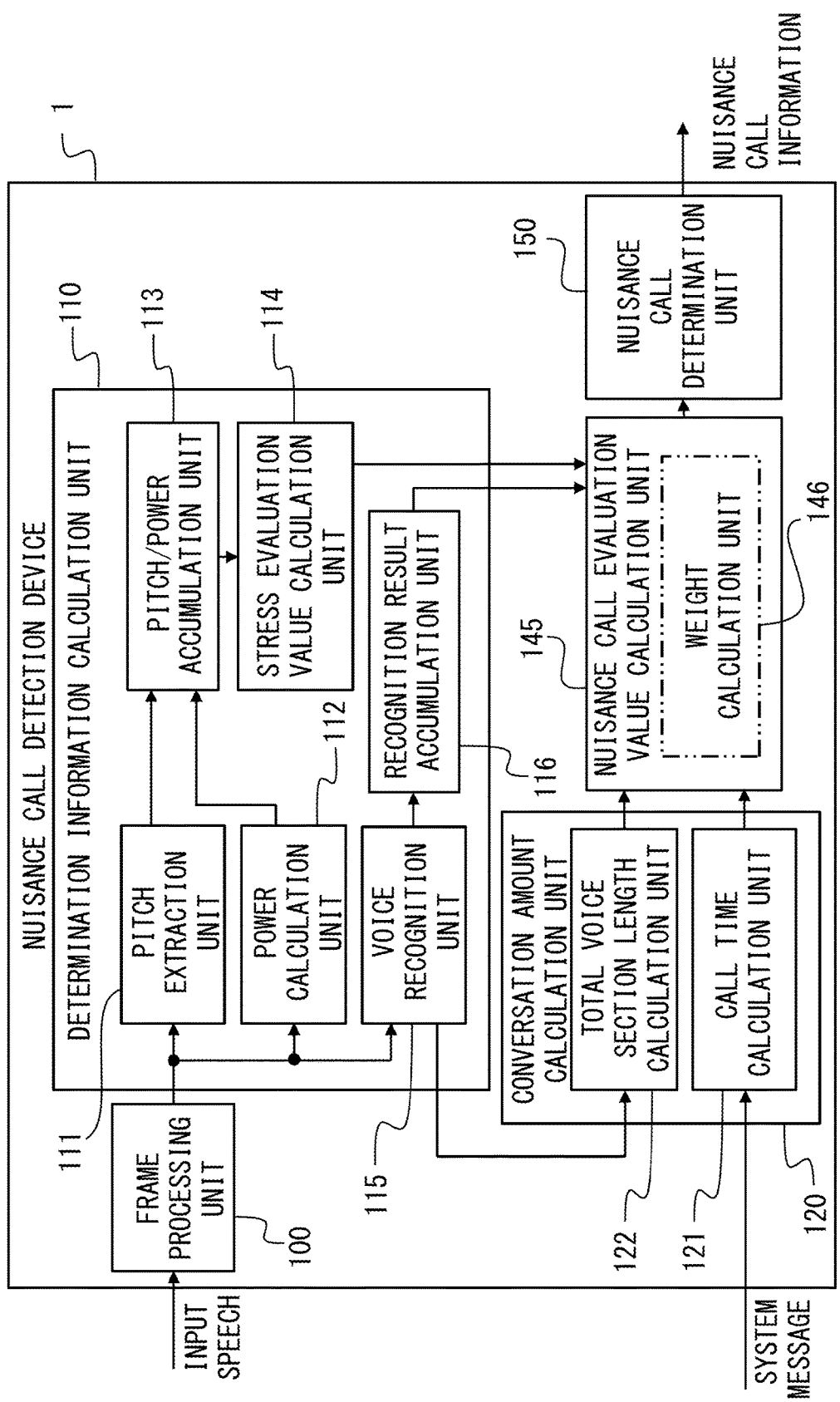
FIG. 11 is a block diagram illustrating a functional configuration of a nuisance call detection device according to a fourth embodiment.

FIG. 11 is a block diagram illustrating a functional configuration of the nuisance call detection device according to the fourth embodiment.

As illustrated in FIG. 11, the nuisance call detection device 1 of the present embodiment includes the frame processing unit 100, the determination information calculation unit 110, the conversation amount calculation unit 120, a nuisance call evaluation value calculation unit 145, and the nuisance call determination unit 150. The frame processing unit 100, the determination information calculation unit 110, the conversation amount calculation unit 120, and the nuisance call determination unit 150 in the nuisance call detection device 1 of the present embodiment are as explained in the second embodiment.

On the other hand, the nuisance call evaluation value calculation unit 145 in the nuisance call detection device 1 of the present embodiment includes a weight calculation unit 146 as illustrated in FIG. 11.

FIG. 12 is a diagram illustrating an example of a neural network.

The nuisance call evaluation value calculation unit 145 uses, for example, the neural network as illustrated in FIG. 12 as a determination function for calculating the nuisance call evaluation value. The neural network includes an input layer, an output layer, and a hidden layer.

The input layer is a layer of a unit that inputs a value used for calculation of the nuisance call evaluation value. In the present embodiment, the call time T1, the total voice section length T2, the stress evaluation value EVS, and the number of detected keywords are used for calculation of the nuisance call evaluation value. Therefore, four units of x1 to x4 are provided as the input layer. For example, the call time T1 to the unit x1, the total voice section length T2 to the unit x2, the stress evaluation value EVS to the unit x3, and the number of the detected keywords to the unit x4 are normalized (for example, an average value 0 and dispersion 1) to a proper value and then are input.

On the other hand, the output layer is a layer of a unit that outputs a probability of nuisance call likelihood. In the present embodiment, for the sake of simplicity, the output layer outputs a probability as to whether the target telephone call is a nuisance call. Therefore, two units of O1 and O2 are provided as the output layer. The unit O1 outputs a probability P(NNC, x) that the target telephone call is not a nuisance call, and the unit O2 outputs a probability P(NC, x) that the target telephone call is a nuisance call.

The hidden layers are used between the input layer and the output layer, and two hidden layers are provided in an example illustrated in FIG. 12. To each branch connecting each unit of the input layer and each unit of a first hidden layer (hidden layer on the lower side), each different weight is set. Further, in each unit of the first hidden layer, a bias is added to a weighting addition of values of all the units of the input layer, and then a value is calculated that is input to an activation function. Also, to each branch connecting each unit of the first hidden layer and each unit of a second hidden layer (hidden layer on the upper side), each different weight is set. Further, in each unit of the second hidden layer, a bias is added to a weighting addition of values of all the units of the first hidden layer, and then a value is calculated that is input to the activation function. Also, to each branch connecting each unit of the second hidden layer and each unit of the output layer, each different weight is set. The unit O1 outputs the probability P(NNC, x) that the target telephone call is not a nuisance call and the unit O2 outputs the probability P(NC, x) that the target telephone call is a nuisance call. That is, the weight calculation unit 146 included in the nuisance call evaluation value calculation unit 145 is indicated by weights and biases of the neural network.

Then, using the probability P (NNC, x) that the target telephone call is not a nuisance call and the probability P (NC, x) that the target telephone call is a nuisance call, output from the units O1 and O2 of the output layer, the nuisance call evaluation value calculation unit 145 calculates the conditional probability P(NC|x) of the nuisance call likelihood using the following formula (6).

$$p(NC \mid x) = \frac{P(NC, x)}{P(NC, x) + P(NNC, x)} \quad (6)$$

Figure 13:
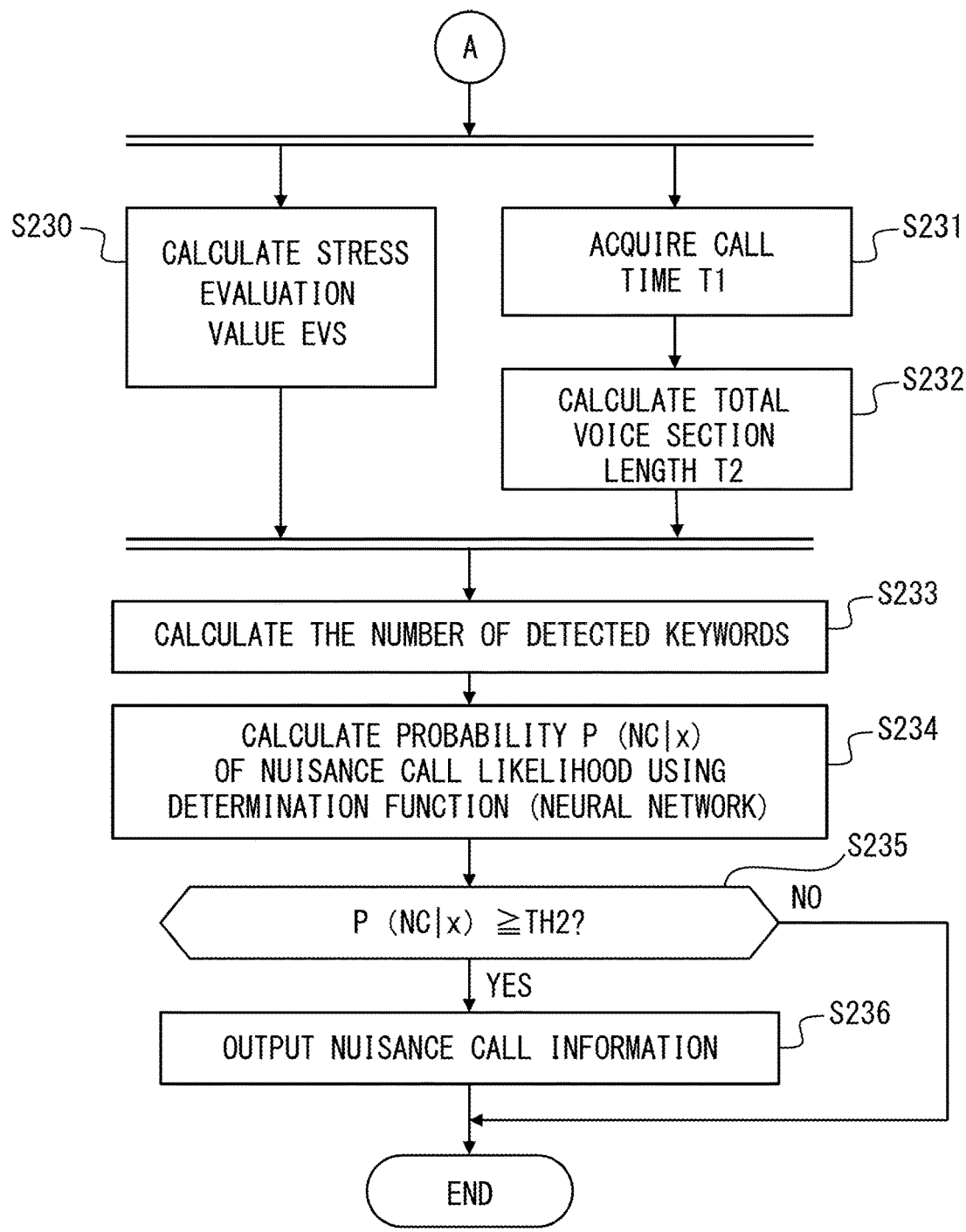
FIG. 13 is a flowchart illustrating part of a nuisance call detection process according to the fourth embodiment.

FIG. 13 is a flowchart illustrating part of the nuisance call detection process according to the fourth embodiment.

In the nuisance call detection process according to the present embodiment, when a telephone call is started in response to a request from the second telephone, the nuisance call detection device 1 performs the process of steps S200 to S207 illustrated in FIG. 6A until the telephone call has been completed. When the telephone call has been completed, the nuisance call detection device 1 then performs the process of steps S230 to S232 as illustrated in FIG. 13. The process of step S230 is performed by the determination information calculation unit 110, and the process of steps S231 and S232 is performed by the conversation amount calculation unit 120.

When a signal is input indicating that the telephone call has been completed, the determination information calculation unit 110 calculates the stress evaluation value EVS using the stress evaluation value calculation unit 114 (step S230). Using the pitch and power accumulated in the pitch/power accumulation unit 113, the stress evaluation value calculation unit 114 calculates the stress evaluation value using the known calculation method.

Further, in the nuisance call detection device 1, a process (step S231) for acquiring the call time T1 and a process (step S232) for calculating the total voice section length T2 are performed in parallel with the process of step S230. The process of step S231 is performed by the call time calculation unit 121 of the conversation amount calculation unit 120, and the process of step S232 is performed by the total voice section length calculation unit 122 of the conversation amount calculation unit 120. The call time calculation unit 121 acquires (calculates) the call time T1, for example, based on the system message from the control unit of the telephone. The total voice section length calculation unit 122 calculates the total voice section length T2 that is a sum of the voice sections in one telephone call based on results of the voice recognition input from the voice recognition unit 115 or results of the voice recognition accumulated in the recognition result accumulation unit 116. The conversation amount calculation unit 120 outputs the call time T1 and the total voice section length T2 to the nuisance call evaluation value calculation unit 145.

When the call time T1 and the total voice section length T2 are input, the nuisance call evaluation value calculation unit 145 first calculates the number of the detected keywords (step S233). The nuisance call evaluation value calculation unit 145 refers to the recognition result accumulation unit 116 of the determination information calculation unit 110 and calculates the number of the detected keywords for each keyword. Then, the nuisance call evaluation value calculation unit 145 calculates the probability P(NC|x) of the nuisance call likelihood using the determination function (neural network) (step S234). In step S234, the nuisance call evaluation value calculation unit 145 calculates the probability P(NC|x) of the likelihood of a call being a nuisance call using formula (6) using the probabilities P(NNC, x) and P(NC, x) output from the neural network as illustrated in FIG. 12. The nuisance call evaluation value calculation unit 145 outputs as the nuisance call evaluation value the probability P (NC, x) of the calculated nuisance call likelihood to the nuisance call determination unit 150.

When the nuisance call evaluation value is input, the nuisance call determination unit 150 determines whether the nuisance call evaluation value (probability P(NC|x) of the nuisance call likelihood) is equal to or greater than the threshold TH2 (step S235). If the nuisance call evaluation value is less than the threshold TH2 (step S235; No), the nuisance call determination unit 150 determines that the target telephone call is not a nuisance call. Thereby, the nuisance call detection device 1 completes the nuisance call detection process without responding to the nuisance call.

On the other hand, if the nuisance call evaluation value is equal to or greater than the threshold TH2 (step S235; Yes), the nuisance call determination unit 150 determines that the target telephone call is a nuisance call and outputs the nuisance call information (step S236). For example, the nuisance call determination unit 150 outputs information including a telephone number of the second telephone. When the nuisance call detection device 1 is built into the first telephone that receives a telephone call (nuisance call) from the second telephone, the nuisance call information output from the nuisance call detection device 1 is displayed, for example, on a display of the first telephone.

As described above, in the present embodiment, the probability P (NC|x) of the nuisance call likelihood calculated using the neural network is used for the nuisance call evaluation value. Therefore, the nuisance call evaluation value calculation unit 145 can obtain an optimum nuisance call evaluation value from among several calculation results in which setting of the weighting factor is different. Therefore, according to the present embodiment, it is possible to determine with a higher accuracy whether the target telephone call is a nuisance call.

Further, the flowcharts illustrated in FIGS. 6A and 13 are an example of the nuisance call detection process according to the present embodiment. In the nuisance call detection process according to the present embodiment, for example, call speech may be recorded and the process of steps S201 to S206 of FIG. 6A may be performed after completion of the telephone call. Further, in the nuisance call detection process according to the present embodiment, the nuisance call evaluation value (probability P(NC|x) of the nuisance call likelihood) may be calculated during the telephone call and the determination as to whether the target telephone call is a nuisance call may be performed.

Fifth Embodiment

In the present embodiment, a system that updates setting of incoming call rejection of a nuisance call as needed will be explained using the results of the detection process by the nuisance call detection device explained in the first to fourth embodiments.

Figure 14:
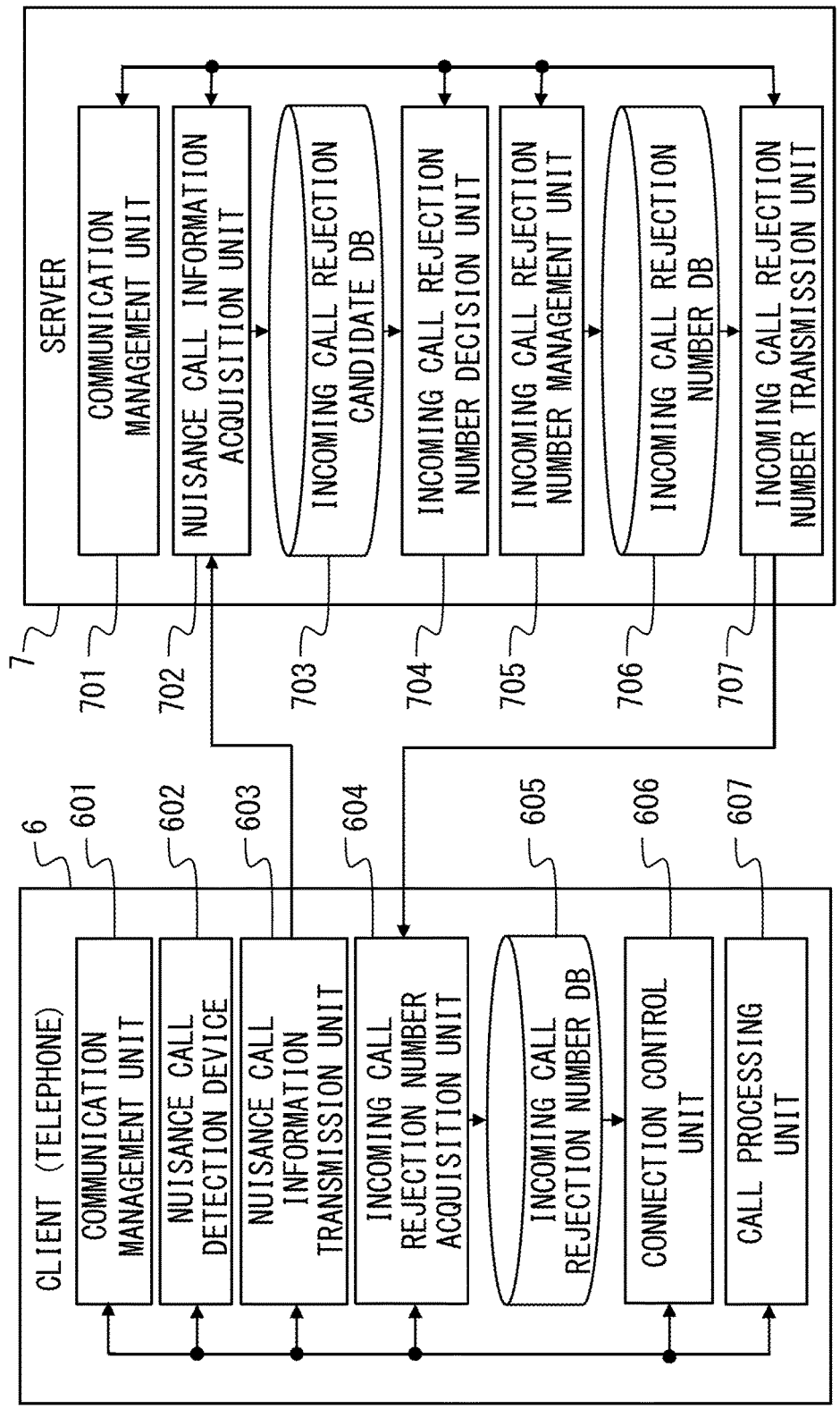
FIG. 14 is a block diagram illustrating a functional configuration of a nuisance call detection system according to a fifth embodiment.

FIG. 14 is a block diagram illustrating a functional configuration of a nuisance call detection system according to the fifth embodiment.

As illustrated in FIG. 14, the nuisance call detection system according to the present embodiment includes a client 6 and a server 7. The client 6 and the server 7 are communicably connected via a communication network such as a Local Area Network (LAN), the Internet, or the like. Only one client 6 is illustrated in FIG. 14; further, in the nuisance call detection system according to the present embodiment, a plurality of the clients 6 can be connected to one server 7.

The client 6 is a communication device capable of being used as a telephone. This client 6 includes a communication management unit 601, a nuisance call detection device 602, a nuisance call information transmission unit 603, an incoming call rejection number acquisition unit 604, and an incoming call rejection number database (incoming call rejection number DB) 605. Further, the client 6 includes a connection control unit 606 and a call processing unit 607.

The communication management unit 601 of the client 6 manages communication and telephone calls between the client 6 and other communication devices that include a telephone.

The nuisance call detection device 602 corresponds to the nuisance call detection device 1 explained in the first to fourth embodiments. The nuisance call information transmission unit 603 transmits to the server 7 nuisance call information output from the nuisance call detection device 602.

The incoming call rejection number acquisition unit 604 acquires from the server 7 a list of telephone numbers (incoming call rejection numbers) in which an incoming call is rejected as a nuisance call. The incoming call rejection number DB 605 accumulates the incoming call rejection numbers acquired from the server 7.

The connection control unit 606 controls establishment and cutoff of connection regarding a telephone call in which the client 6 and other telephones are used. The call processing unit 607 performs processing etc. of voice signals in a telephone call in which the client 6 and other telephones are used.

On the other hand, the server 7 specifies a telephone number from which a nuisance call is made based on the nuisance call information collected from the plurality of the clients 6, and accumulates the telephone number as an incoming call rejection number. Further, the server 7 transmits (provides) the accumulated incoming call rejection numbers to the client 6. This server 7 includes a communication management unit 701, a nuisance call information acquisition unit 702, an incoming call rejection candidate database (incoming call rejection candidate DB) 703, and an incoming call rejection number decision unit 704. Further, the server 7 includes an incoming call rejection number management unit 705, an incoming call rejection number database (incoming call rejection number DB) 706, and an incoming call rejection number transmission unit 707.

The communication management unit 701 of the server 7 manages communication with the plurality of the clients 6. The nuisance call information acquisition unit 702 acquires the nuisance call information transmitted from the client 6. The incoming call rejection candidate DB 703 accumulates telephone numbers included in the nuisance call information acquired from the client 6 as incoming call rejection candidates.

The incoming call rejection number decision unit 704 refers to the incoming call rejection candidates (telephone numbers) accumulated in the incoming call rejection candidate DB 703 and decides whether to register the incoming call rejection candidate to the incoming call rejection number. The incoming call rejection number management unit 705 accumulates in the incoming call rejection number DB 706 and manages the telephone numbers that are decided to be registered to the incoming call rejection number by the incoming call rejection number decision unit 704. The incoming call rejection number transmission unit 707 transmits to the client 6 the incoming call rejection numbers accumulated in the incoming call rejection number DB 706.

Figure 15A:
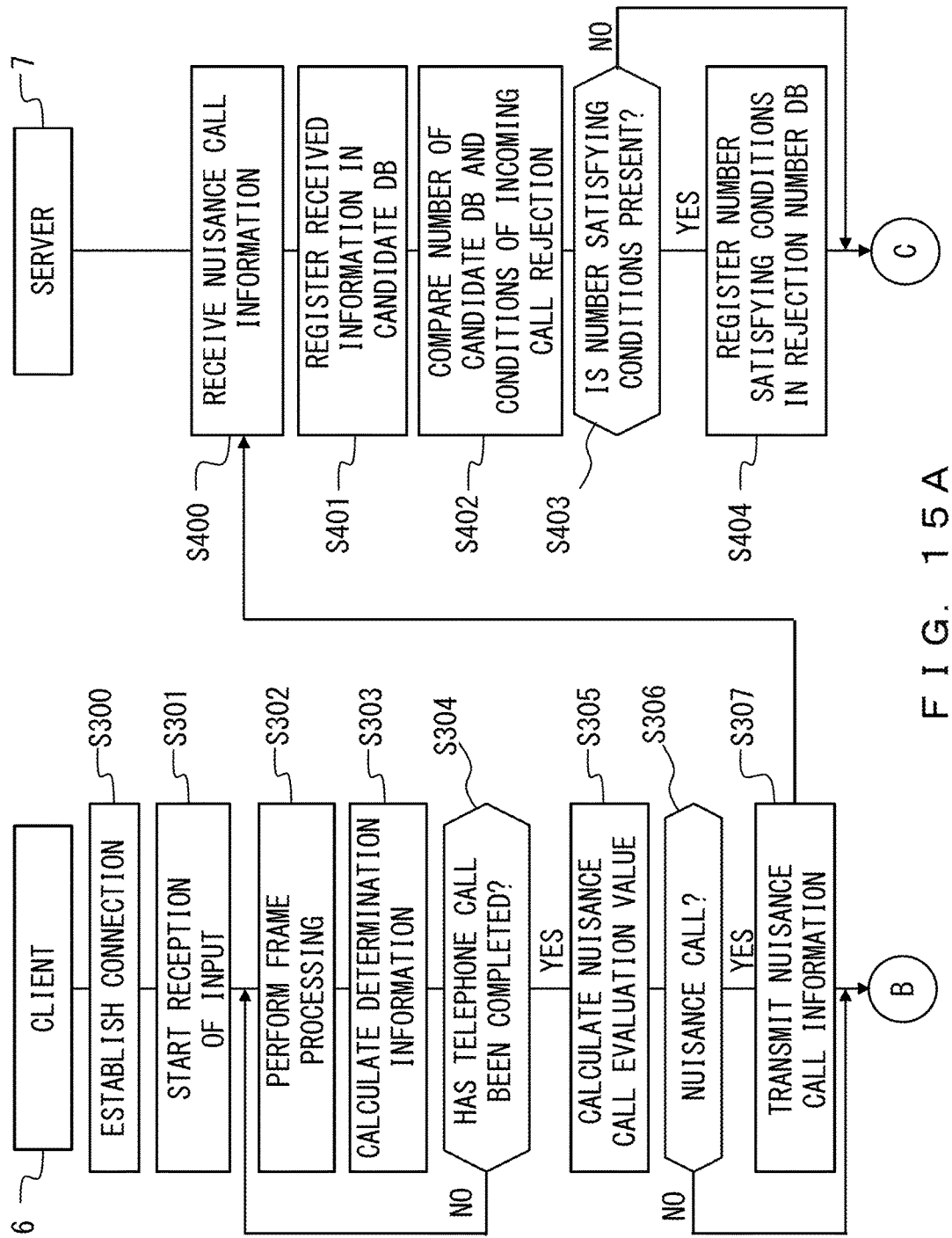
FIG. 15A is a sequence diagram (part 1) illustrating processing that is performed by the nuisance call detection system according to the fifth embodiment.
Figure 15B:
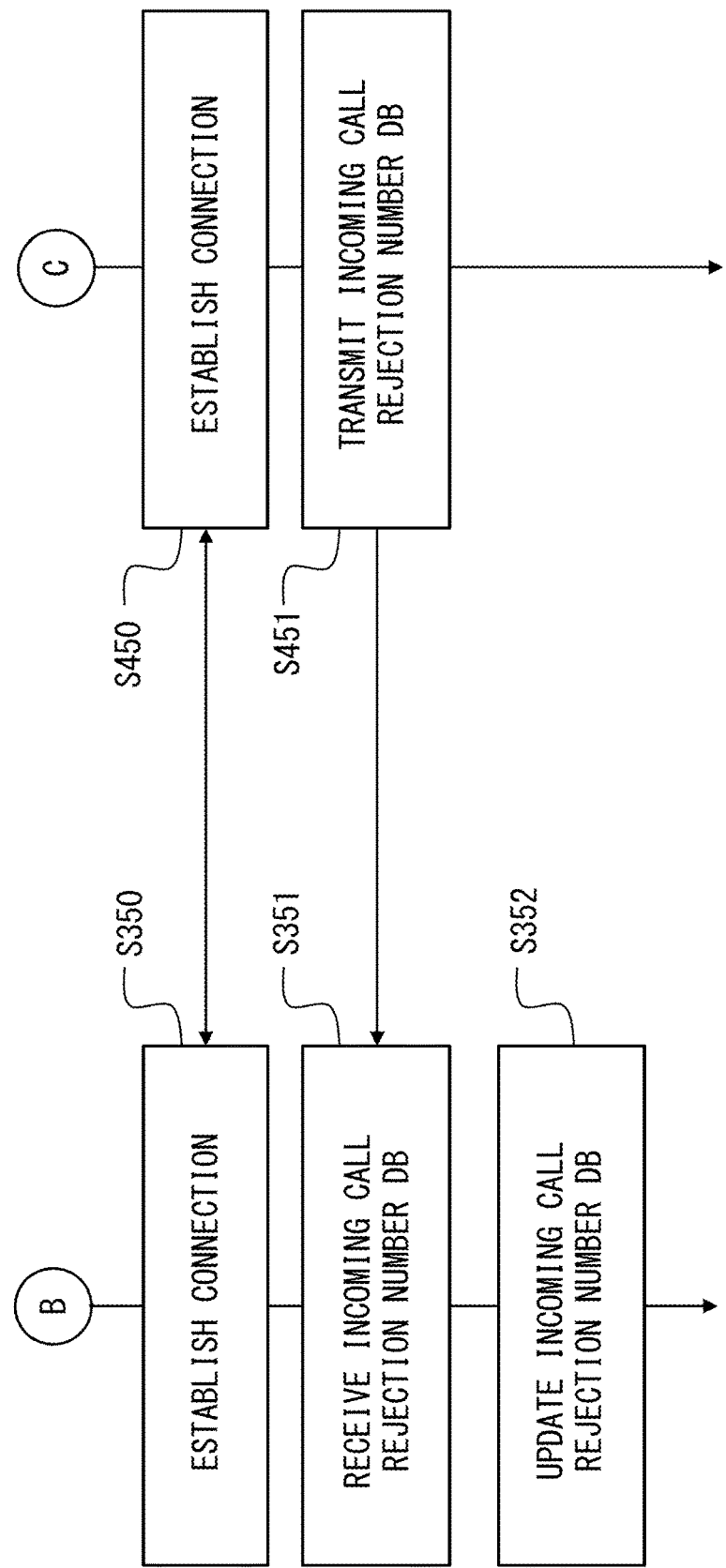
FIG. 15B is a sequence diagram (part 2) illustrating processing that is performed by the nuisance call detection system according to the fifth embodiment.

FIG. 15A is a sequence diagram (part 1) illustrating processing that is performed by the nuisance call detection system according to the fifth embodiment. FIG. 15B is a sequence diagram (part 2) illustrating processing that is performed by the nuisance call detection system according to the fifth embodiment.

In the nuisance call detection system of the present embodiment, as described above, when a nuisance call is detected in the client 6, the nuisance call information is transmitted to the server 7 from the client 6.

As illustrated in FIG. 15A, the client 6 first establishes the connection in response to an establishment request for the connection regarding a telephone call from another telephone (step S300). The process of step S300 is performed by the connection control unit 606 of the client 6. The connection control unit 606 refers to the incoming call rejection number DB 605 and determines that a telephone number of a telephone that makes the establishment request for the connection is not the incoming call rejection number, so that the connection is established in response to the establishment request.

When the connection is established, the client 6 starts reception of an input of call signals (step S301), and performs frame processing (step S302) and calculation processing (step S303) of determination information. The process of steps S301 to S303 is performed by the nuisance call detection device 602. As the process of steps S301 to S303, the nuisance call detection device 602 performs the process (see FIG. 2) of steps S100 to S102 explained in the first embodiment or the process (see FIG. 6A) of steps S200 to S206 explained in the second embodiment. Further, the client 6 repeats the process of steps S302 and S303 until a telephone call has been completed (step S304).

When the telephone call has been completed (step S304; Yes), the client 6 performs a process (step S305) for calculating the nuisance call evaluation value of the telephone call that has been performed immediately before. The process of step S305 is performed by the nuisance call detection device 602 of the client 6. As the process of step S305, for example, the client 6 performs the process (see FIG. 2) of steps S104 to S106 explained in the first embodiment or the process (see FIG. 6B) of steps S208 to S213 explained in the second embodiment. Further, as the process of step S305, the client 6 may perform the process (see FIG. 10) of steps S220 to S226 explained in the third embodiment or the process (see FIG. 13) of steps S230 to S234 explained in the fourth embodiment.

Subsequently, based on the calculated nuisance call evaluation value, the client 6 determines whether a target telephone call is a nuisance call (step S306). If the target telephone call is a nuisance call (step S306; Yes), the client 6 transmits the nuisance call information to the server 7 (step S307). The process of step S307 is performed by the nuisance call information transmission unit 603 of the client 6. As the nuisance call information, the client 6 transmits to the server the telephone number of a target call partner and the determination information such as the call time, the stress evaluation value, the keyword evaluation value, or the nuisance call evaluation value. Although saved in FIG. 15A, when the nuisance call information is transmitted to the server 7 from the client 6, a process is performed for establishing the connection between the client 6 and the server 7 in accordance with a predetermined communication protocol. Then, when the connection is established, the nuisance call information is transmitted to the server 7 from the client 6. When transmission of the nuisance call information has been completed, the connection is cut off between the client 6 and the server 7.

When the nuisance call information is received from the client 6 (step S400), the server 7 registers the received information in the incoming call rejection candidate DB 703 (step S401). The process of steps S400 and S401 is performed by the nuisance call information acquisition unit 702.

Next, the server 7 compares incoming call rejection conditions and the telephone numbers contained in the nuisance call information registered in the incoming call rejection candidate DB 703 (step S402), and determines whether a number satisfying the conditions is used (step S403). The process of steps S402 and S403 is performed by the incoming call rejection number decision unit 704. For example, if the cumulative nuisance call evaluation value corresponding to the same telephone number in a given period (for example, in five days) is more than the first threshold (for example, 250), the incoming call rejection number decision unit 704 determines that the number satisfies the conditions (step S403; Yes). Further, for example, if the number of times of the detection corresponding to the same telephone number in a given period (for example, in five days) is more than the second threshold (for example, five times), the incoming call rejection number decision unit 704 determines that the number satisfies the conditions (step S403; Yes). If the telephone number satisfies the conditions, the incoming call rejection number decision unit 704 reports as the incoming call rejection number the telephone number to the incoming call rejection number management unit 705.

The incoming call rejection number management unit 705 that has received a notification of the incoming call rejection number registers the nuisance call information containing the incoming call rejection number in the incoming call rejection number DB 706 (step S404).

Further, periodically or when the contents of the incoming call rejection number DB 706 are changed, the server 7 transmits the incoming call rejection number DB 706 to the client 6. As illustrated in FIG. 15B, when the server 7 transmits the incoming call rejection number DB 706 to the client 6, a process (steps S450 and S350) for establishing the connection is performed between the server 7 and the client 6. Then, when the connection is established, the incoming call rejection number transmission unit 707 of the server 7 transmits the incoming call rejection number DB to the client 6 (step S451). When the incoming call rejection number acquisition unit 604 receives the incoming call rejection number DB from the server 7 (step S351), the client 6 updates data of the incoming call rejection number DB 605 to the received incoming call rejection number data (step S352).

Subsequently, when an establishment request for the connection is received from another telephone, the client 6 refers to the updated incoming call rejection number DB 605 and determines whether to reject an incoming call.

As described above, in the nuisance call detection system of the present embodiment, the server 7 collects information on the nuisance call detected by the client 6 and manages telephone numbers in which the incoming call is rejected as a nuisance call to thereby provide the information on the nuisance call to the client 6. Therefore, it is possible for the plurality of clients 6 to share the information on the nuisance call. Therefore, even when the client 6 itself receives an establishment request for the connection from a telephone having a telephone number for which it has not been determined based on call contents whether the target telephone call is a nuisance call, it is possible to determine that the target telephone call is a nuisance call without responding.

For example, when the incoming call rejection candidate registered in the incoming call rejection candidate DB 703 satisfies conditions different from the above conditions, the incoming call rejection number decision unit 704 of the server 7 may exclude the incoming call rejection candidate from the candidates. On this occasion, for example, as conditions of excluding the incoming call rejection candidate from the candidates, the incoming call rejection candidate is excluded from the candidates in the case in which the number of times of detection corresponding to the same telephone number in a given period (e.g., in five days) is less than the third threshold (e.g., twice).

Sixth Embodiment

In the present embodiment, a detection system will be explained that learns a weighting function and updates the weighting function as needed using the results of the detection process by the nuisance call detection device explained in the first to fourth embodiments.

Figure 16:
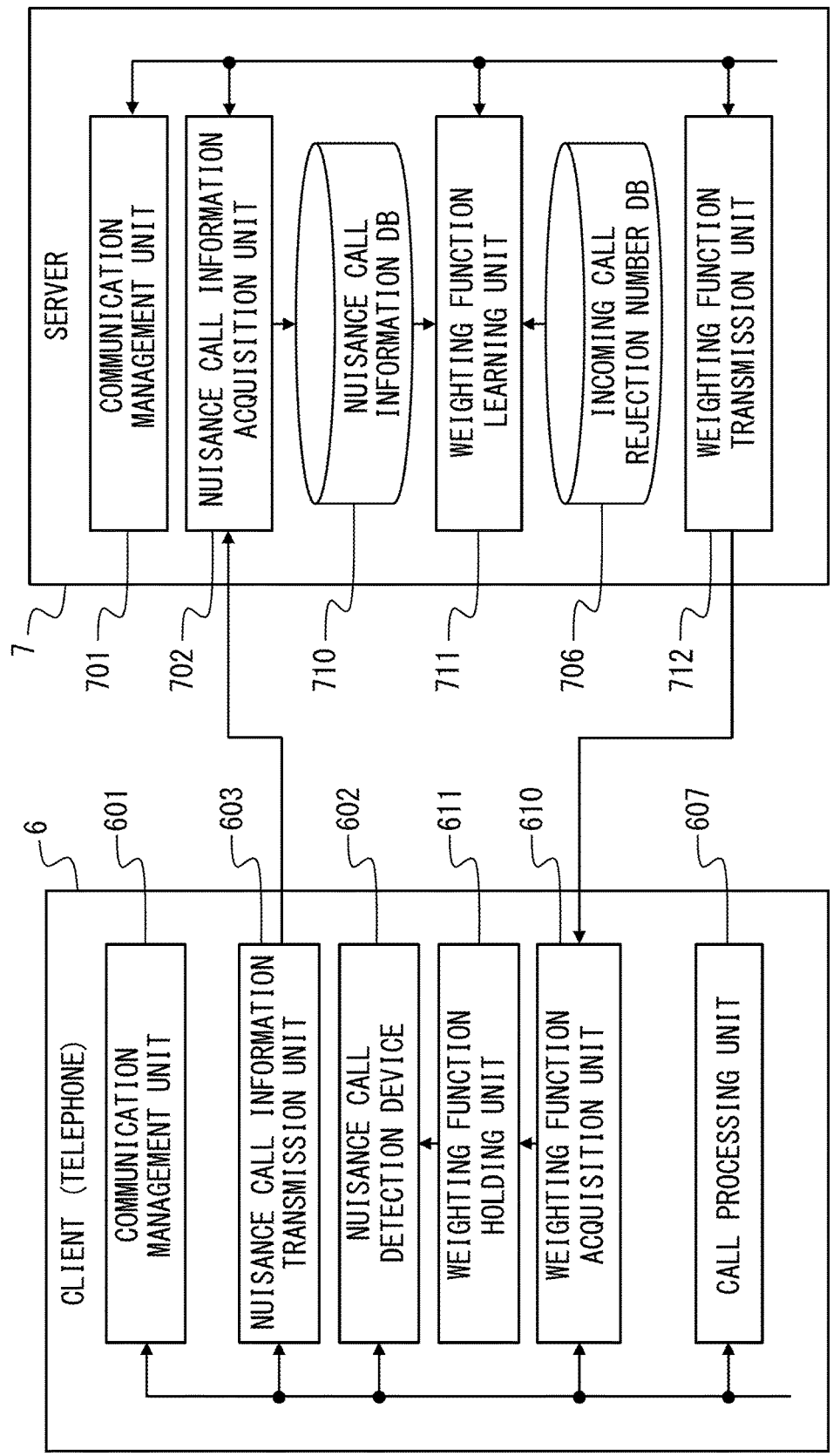
FIG. 16 is a block diagram illustrating a functional configuration of a nuisance call detection system according to a sixth embodiment.

FIG. 16 is a block diagram illustrating a functional configuration of a nuisance call detection system according to the sixth embodiment.

As illustrated in FIG. 16, the nuisance call detection system according to the present embodiment includes the client 6 and the server 7. The client 6 and the server 7 are communicably connected via a communication network such as a LAN or the Internet. In FIG. 16, only one client 6 is illustrated; further, a plurality of the clients 6 are connectable to one server 7 in the nuisance call detection system according to the present embodiment.

The client 6 is a communication device capable of being used as a telephone. This client 6 includes the communication management unit 601, the nuisance call detection device 602, the nuisance call information transmission unit 603, and the call processing unit 607. Further, the client 6 includes a weighting function acquisition unit 610 and a weighting function holding unit 611. Further, although not illustrated in FIG. 16, the client 6 includes the incoming call rejection number acquisition unit 604, the incoming call rejection number DB 605, and the connection control unit 606 explained in the fifth embodiment (see FIG. 14).

The communication management unit 601 of the client 6 manages communication and telephone calls between the client 6 and other communication devices that include a telephone.

The nuisance call detection device 602 corresponds to the nuisance call detection device 1 explained in the first to fourth embodiments. The nuisance call information transmission unit 603 transmits to the server 7 the nuisance call information output from the nuisance call detection device 602.

The weighting function acquisition unit 610 acquires a latest weighting function w(T1) or the like from the server 7 and holds the weighting function w(T1) in the weighting function holding unit 611.

The call processing unit 607 performs processing etc. of a voice signal in the telephone call by the client 6 and other telephones.

On the other hand, the server 7 specifies a telephone number from which a nuisance call is made based on the nuisance call information collected from the plurality of the clients 6 and accumulates the telephone number as an incoming call rejection number. Further, the server 7 transmits (provides) the accumulated incoming call rejection numbers to the clients 6. Further, the server 7 optimizes the weighting function w(T1) etc. by re-learning the weighting function w(T1) etc. based on the nuisance call information on the accumulated incoming call rejection numbers and transmits (provides) the weighting function w(T1) to the client 6. This server 7 includes the communication management unit 701, the nuisance call information acquisition unit 702, the incoming call rejection number DB 706, a nuisance call information database (nuisance call information DB) 710, a weighting function learning unit 711, and a weighting function transmission unit 712. Further, although not illustrated in FIG. 16, the server 7 includes the incoming call rejection candidate DB 703, the incoming call rejection number decision unit 704, the incoming call rejection number management unit 705, and the incoming call rejection number transmission unit 707 explained in the fifth embodiment.

The communication management unit 701 of the server 7 manages communication with the plurality of the clients 6.

The nuisance call information acquisition unit 702 acquires the nuisance call information transmitted from the client 6. The nuisance call information acquisition unit 702 accumulates the acquired nuisance call information in the nuisance call information DB 710 and the incoming call rejection candidate DB 703 (not illustrated).

The weighting function learning unit 711 re-learns the weighting function w(T1) etc. based on data accumulated in the nuisance call information DB 710 and the incoming call rejection number DB 706. The weighting function transmission unit 712 transmits to the client 6 a new weighing function w(T1) etc. obtained by re-learning.

Figure 17A:
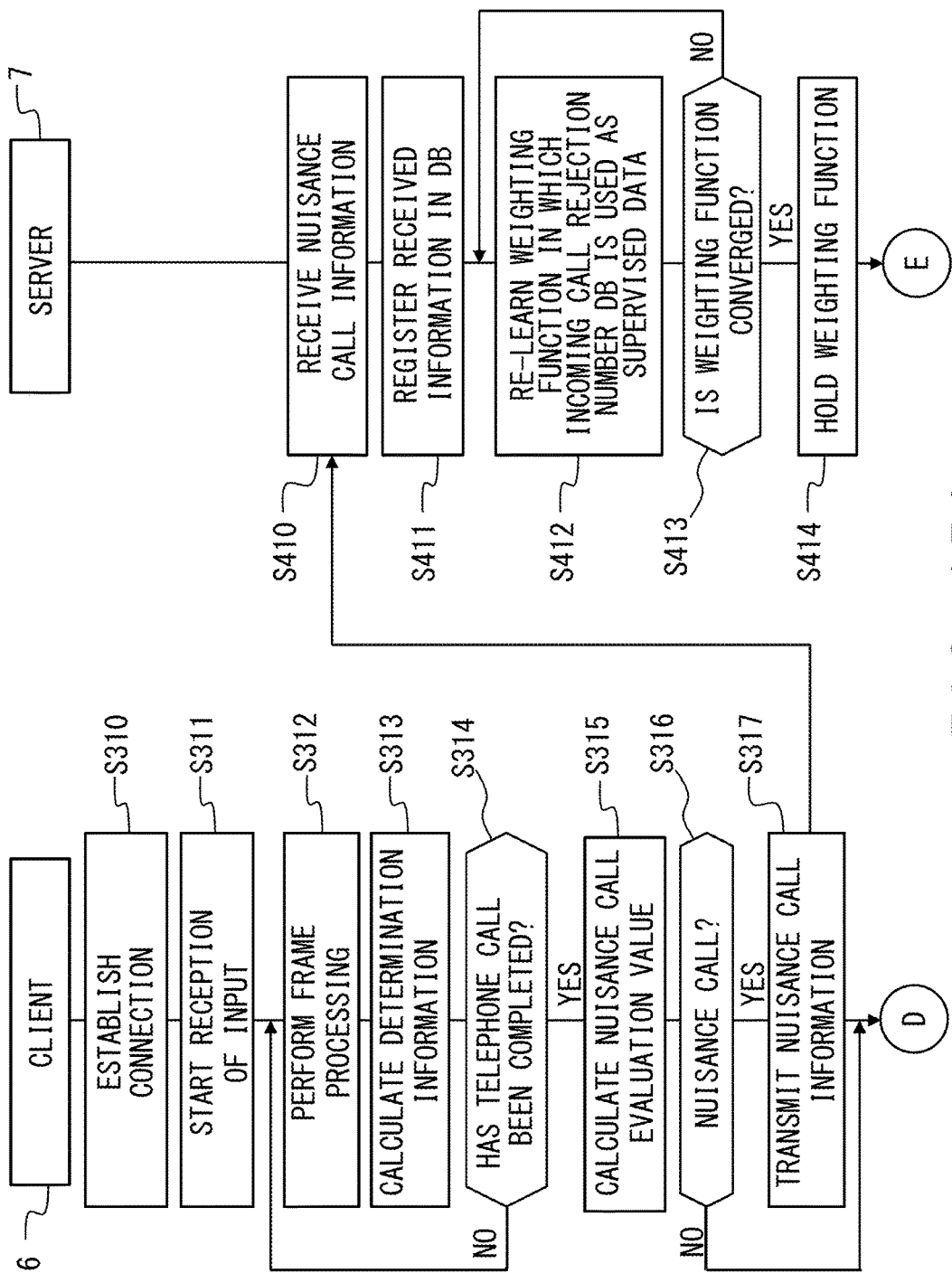
FIG. 17A is a sequence diagram (part 1) illustrating processing that is performed by the nuisance call detection system according to the sixth embodiment.
Figure 17B:
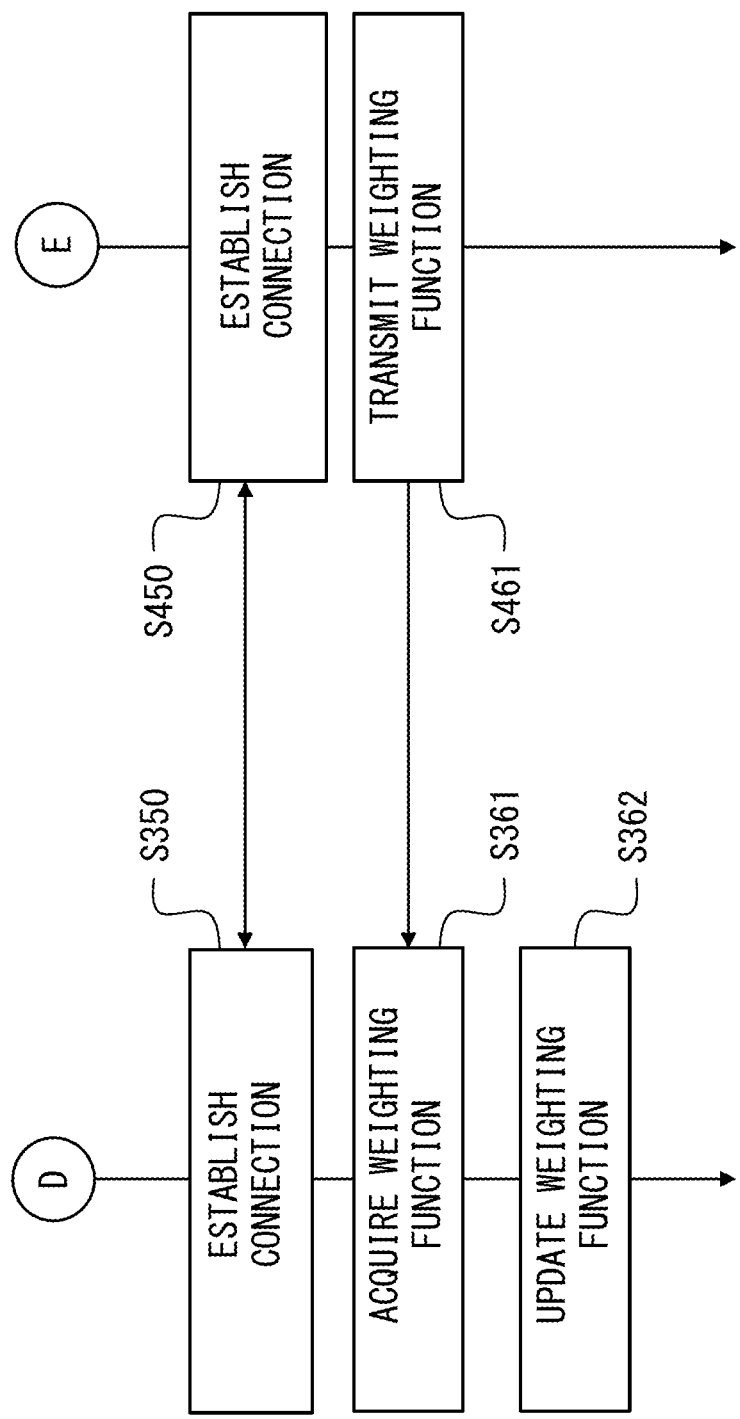
FIG. 17B is a sequence diagram (part 2) illustrating processing that is performed by the nuisance call detection system according to the sixth embodiment.

FIG. 17A is a sequence diagram (part 1) illustrating processing that is performed by the nuisance call detection system according to the sixth embodiment. FIG. 17B is a sequence diagram (part 2) illustrating processing that is performed by the nuisance call detection system according to the sixth embodiment.

In the nuisance call detection system of the present embodiment, as described above, when a nuisance call is detected in the client 6, the nuisance call information is transmitted to the server 7 from the client 6.

As illustrated in FIG. 17, the client 6 first establishes a connection in response to an establishment request for a connection regarding a telephone call from another telephone (step S310). The process of step S310 is performed by the connection control unit 606 of the client 6. The connection control unit 606 refers to the incoming call rejection number DB 605 and determines that a telephone number of a telephone that has made the establishment request for the connection is not an incoming call rejection number, so that the connection is established in response to the establishment request.

When the connection is established, the client 6 starts reception of an input of call signals (step S311), and performs frame processing (step S312) and calculation processing (step S313) of the determination information. The process of steps S311 to S313 is performed by the nuisance call detection device 602. As the process of steps S311 to S313, the nuisance call detection device 602 performs the process (see FIG. 2) of steps S100 to S102 explained in the first embodiment or the process (see FIG. 6A) of steps S200 to S206 explained in the second embodiment. Further, the client 6 repeats the process of steps S312 and S313 until the telephone call has been completed (step S314).

When the telephone call has been completed (step S314; Yes), the client 6 performs a process (step S315) for calculating the nuisance call evaluation value regarding the telephone call that has been performed immediately before. The process of step S315 is performed by the nuisance call detection device 602 of the client 6. As the process of step S315, for example, the client 6 performs the process (see FIG. 2) of steps S104 to S106 explained in the first embodiment or the process (see FIG. 6B) of steps S208 to S213 explained in the second embodiment. Further, as the process of step S315, the client 6 may perform the process (see FIG. 10) of steps S220 to S226 explained in the third embodiment or the process (see FIG. 13) of steps S230 to S234 explained in the fourth embodiment.

Then, based on the calculated nuisance call evaluation value, the client 6 determines whether a target telephone call is a nuisance call (step S316). If the target telephone call is a nuisance call (step S316; Yes), the client 6 transmits the nuisance call information to the server 7 (step S317). The process of step S317 is performed by the nuisance call information transmission unit 603 of the client 6. As the nuisance call information, the client 6 transmits to the server 7 the telephone number and the determination information such as the call time, the stress evaluation value, the keyword evaluation value, or the nuisance call evaluation value. Although saved in FIG. 17A, when the nuisance call information is transmitted to the server 7 from the client 6, a process is performed for establishing a connection between the client 6 and the server 7 in accordance with a predetermined communication protocol. Then, when the connection is established, the nuisance call information is transmitted to the server 7 from the client 6. When transmission of the nuisance call information has been completed, the connection is cut off between the client 6 and the server 7.

When the nuisance call information is received from the client 6 (step S410), the server 7 registers the received information in the nuisance call information DB 710 and the incoming call rejection candidate DB 703 (step S411). The process of steps S410 and S411 is performed by the nuisance call information acquisition unit 702. Further, although not illustrated in FIG. 17A, after the process of step S411, the server 7 performs the process of steps S402 to S404 explained in the fifth embodiment and updates data of the incoming call rejection number DB 706.

In parallel with an update process of data of the incoming call rejection number DB 706 or after the update process, the server 7 re-learns the weighting function in which the incoming call rejection number DB 706 is used as a supervisor data (step S412). The process of step S412 is performed by the weighting function learning unit 711. The weighting function learning unit 711 performs learning processing of step S412 until the weighting function is converged (step S413).

When the re-learnt weighting function is converged (step S413; Yes), the server 7 holds the weighting function after learning (step S414).

Further, periodically or when the weighting function is re-learnt, the server 7 transmits the weighting function after learning to the client 6. As illustrated in FIG. 17B, when the server 7 transmits the weighting function to the client 6, a process (steps S450 and S350) for establishing the connection is performed between the server 7 and the client 6. Then, when the connection is established, the weighting function transmission unit 712 of the server 7 transmits the weighting function to the client 6 (step S461). When the weighting function acquisition unit 610 receives the weighting function from the server 7 (step S361), the client 6 updates the weighting function of the weighting function holding unit 611 to the received weighting function after re-learning (step S362).

Subsequently, using the weighting function after re-learning, the client 6 calculates the weighting factor in the case of calculating the nuisance call evaluation value based on the determination information.

Further, although not illustrated in FIG. 17B, when the connection is established between the server 7 and the client 6 by the process of steps S450 and S350, the server 7 may transmit to the client 6 the data of the incoming call rejection number DB along with the weighting function after re-learning.

As described above, in the nuisance call detection system of the present embodiment, the server 7 re-learns the weighting function based on the nuisance call information collected from the client 6 and the data of the incoming call rejection number DB 706. Therefore, the server 7 can optimize the weighting function based on the content of a telephone call that is determined to be a nuisance call by the server 7 from among the telephones (telephone calls) detected as making nuisance calls by the client 6. Therefore, according to the present embodiment, the weighting function after re-learning is provided to the client 6 from the server 7 to thereby improve detection accuracy of nuisance calls by the client 6.

Further, in the nuisance call detection system of the present embodiment, the server 7 collects information on the nuisance call detected by the client 6 and manages telephone numbers in which an incoming call is rejected as a nuisance call to thereby provide information on the nuisance calls to the client 6. Consequently, it is possible for a plurality of clients to share information on nuisance calls. Therefore, even when the client 6 itself receives an establishment request for a connection from a telephone of a telephone number in which it has not been determined based on the call contents whether the target telephone call is a nuisance call, it is possible to determine that the target telephone call is a nuisance call without responding.

Figure 18:
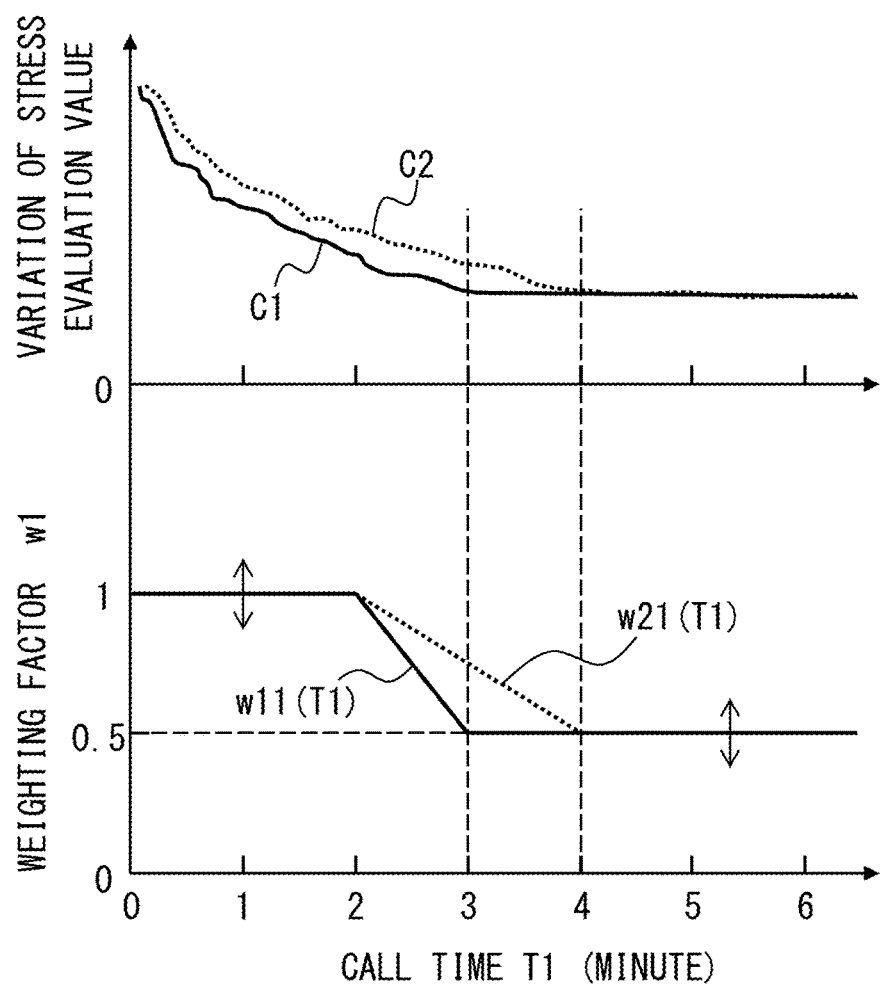
FIG. 18 is a graph chart illustrating an example of a method for learning a first weighting function.

FIG. 18 is a graph chart illustrating an example of a method for learning the first weighting function.

The first weighting function is, for example, a function used for calculation of the weighting factor w in the case of calculating the nuisance call evaluation value EVN by formula (3). This weighting factor w is correlated with the contribution rate of the stress evaluation value to the nuisance call evaluation value. Therefore, the first weighting function is correlated with the stress evaluation value.

A graph on the upper side of FIG. 18 shows variations in the stress evaluation value for each call time. The variations in the stress evaluation value are, for example, dispersion etc. of evaluation values. Suppose, for example, that a result in which a relationship is investigated between the call time T1 and the variation in the stress evaluation value is drawn by a curve C1 shown by a solid line using a plurality of voice samples that has been prepared previously. As the time is longer in a section in which the call time T1 is short, the variation in the stress evaluation value shown by this curve C1 decreases more and, when the call time T1 is greater than three minutes, is converged into a substantially constant value. Therefore, in the case in which the weighting function is set based on the curve C1, as in a polygonal line shown by a solid line in a graph on the lower side of FIG. 18, for example, when the call time T1 is equal to or greater than three minutes, the weighting function w11 (T1) is set such that the weighting factor w1 is equal to a minimum value.

Then, suppose, for example, that a result in which the call time T1 and the variation in the stress evaluation value are calculated based on the nuisance call information collected by the server 7 is drawn by a curve C2 shown by a dotted line in the graph on the upper side of FIG. 18. As the time is longer in the section in which the call time T1 is short, the variation in the stress evaluation value shown by the curve C2 decreases more and, when the call time T1 is more than four minutes, is converged into a substantially constant value. As described above, in the case in which the call time T1 is lengthened when the variation in the stress evaluation value is converged, the server 7 sets, as in a polygonal line shown by a dotted line in the graph on the lower side of FIG. 18, a weighting function w21(T1) such that the weighting factor w1 is equal to a minimum value when the call time T1 is equal to or greater than four minutes.

Further, in the case of re-learning the first weighting function, based on data contained in the nuisance call information or values indicating variations in the stress evaluation value, for example, the server 7 adjusts a value of the weighting factor w1 at the time when the call time T1 is short and a value of the weighting factor w1 at the time when the call time T1 is long.

Descriptions referring to drawings are omitted; further, a weighting function used for calculation of the weighting factor w2 based on the total voice section length T2 explained in the second and third embodiments is re-learnt (adjusted) by the same method as that of the weighting function w1 based on the call time T1.

FIG. 19 is a graph chart illustrating an example of a method for learning the second weighting function.

The second weighting function is, for example, a function used for calculation of the weighting factor α in the case of calculating the keyword evaluation value EVK by formula (4). As explained in the third embodiment, an appearance frequency of the keyword is correlated with the call time.

A graph on the upper side of FIG. 19 shows a frequency distribution of the number of the detected keywords for each call time. For example, when the number of the detected keywords that frequently appear is investigated in the case in which the call time is short based on a plurality of voice samples that has been prepared previously, a distribution as in a curve CS1 shown by a heavy solid line is obtained. In the same way, when the number of the detected keywords that frequently appear is investigated in the case in which the call time is long, a distribution as in a curve CL1 shown by a thin solid line is obtained. In the frequency distribution of the number of the detected keywords shown by the curves CS1 and CL1, when the call time T1 is equal to about one minute thirty seconds, the curve CS1 is made to be maximum, whereas when the call time T1 is equal to about three minutes, the curve CS1 is substantially equal to zero. Further, in the frequency distribution of the number of the detected keywords shown by the curves CS1 and CL1, when the call time T1 is more than about one minute thirty seconds, a value of the curve CL1 starts to increase. Therefore, when the weighting function is set based on the curves CS1 and CL1, for example, the weighting function α11 (T1) is set as in a polygonal line shown by a solid line in the graph on the lower side of FIG. 19. That is, when the call time T1 is more than about one minute thirty seconds, the weighting factor α1 is equal to a value that is less than one, whereas when the call time T1 is equal to or greater than three minutes, the weighting function α11 (T1) is set such that the weighting factor α1 is equal to zero.

Then, suppose, for example, that a result in which the frequency distribution of the number of the detected keywords is calculated based on the nuisance call information collected by the server 7 is drawn by curves CS2 and CL2 shown by a dotted line in the graph on the upper side of FIG. 19. A call time that is made to be maximum in the frequency distribution shown by the curve CS2 is longer than that of the curve CS1. Further, a call time that starts to increase in the frequency distribution shown by the curve CL2 is longer than that of the curve CL1. In this case, as in a polygonal line shown by a dotted line in the graph on the lower side of FIG. 19, the server 7 sets the weighting function α21(T1) so that the call time T1 is lengthened in which the weighting factor α1 falls to a value that is less than one.

Descriptions referring to drawings are omitted; further, a weighting function used for calculation of the weighting factor α2 based on the total voice section length T2 explained in the second and third embodiments is re-learnt (adjusted) by the same method as that of the weighting function α1 based on the call time T1.

Also, descriptions referring to drawings are omitted; for example, when a probability of the nuisance call likelihood using a neural network (determination function) as the nuisance call evaluation value is calculated, the weights and bias are re-learnt by the following method. That is, using the following two pieces of nuisance call information as input data, a supervised data is given to the output layer of the network and the weights and bias of the network are re-learnt by the back propagation method.

(1) Nuisance call information on the telephone numbers that are newly registered in the incoming call rejection number.

(2) Nuisance call information on the telephone numbers that are not registered in the incoming call rejection number.

The nuisance call information of (1) is learnt by giving 1 as a supervised data to a unit that outputs a probability of the target telephone call being a nuisance call, and the nuisance call information of (2) is learnt by giving 0 as a supervised data to a unit that outputs a probability of the target telephone call not being a nuisance call.

Seventh Embodiment

In the present embodiment, a detection system will be explained that sets a weighting factor in each keyword and updates a weighting factor of each keyword as needed in the case of calculating a keyword evaluation value explained in the second and third embodiments.

Figure 20A:
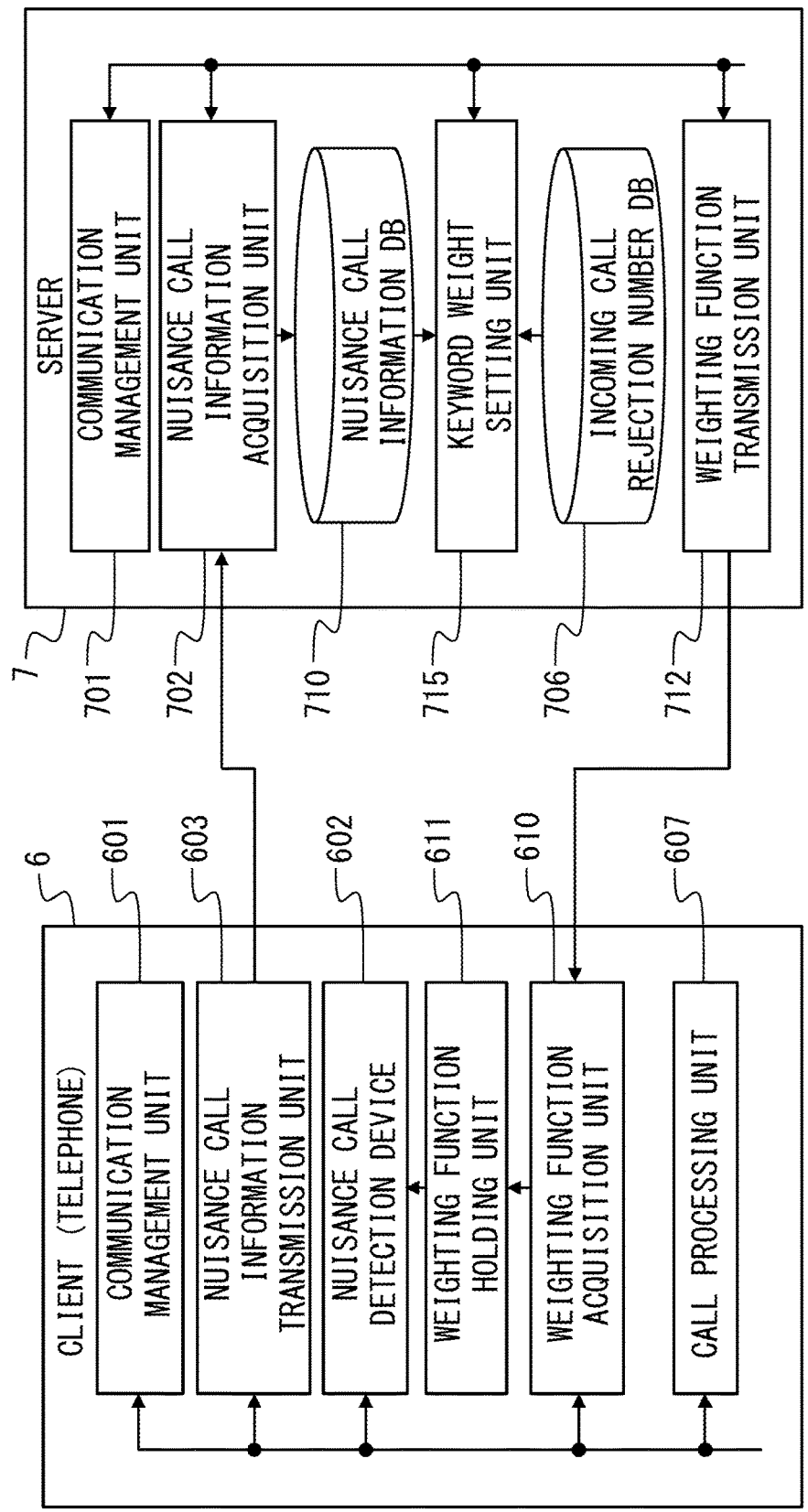
FIG. 20A is a block diagram illustrating a functional configuration of a nuisance call detection system according to a seventh embodiment.

FIG. 20A is a block diagram illustrating a functional configuration of a nuisance call detection system according to the seventh embodiment. FIG. 20B is a diagram illustrating a configuration of a keyword weight setting unit in the nuisance call detection system according to the seventh embodiment.

As illustrated in FIG. 20A, the nuisance call detection system according to the present embodiment includes the client 6 and the server 7. The client 6 and the server 7 are communicably connected via a communication network such as a LAN or the Internet. In FIG. 20A, only one client 6 is illustrated; further, a plurality of the clients 6 are connectable to one server 7 in the nuisance call detection system according to the present embodiment.

The client 6 is a communication device capable of being used as a telephone. This client 6 includes the communication management unit 601, the nuisance call detection device 602, the nuisance call information transmission unit 603, and the call processing unit 607. Further, the client 6 includes the weighting function acquisition unit 610 and the weighting function holding unit 611. Further, although not illustrated in FIG. 20A, the client 6 includes the incoming call rejection number acquisition unit 604, the incoming call rejection number DB 605, and the connection control unit 606 explained in the fifth embodiment (see FIG. 14).

The communication management unit 601 of the client 6 manages communication and telephone calls between the client 6 and other communication devices that include a telephone.

The nuisance call detection device 602 corresponds to the nuisance call detection device 1 explained in the first to fourth embodiments. The nuisance call information transmission unit 603 transmits to the server 7 the nuisance call information output from the nuisance call detection device 602.

The weighting function acquisition unit 610 acquires a latest weighting function w(T1) etc. or a weighting factor for each keyword from the server 7 and holds the weighting function w(T1) or the weighting factor in the weighting function holding unit 611.

The call processing unit 607 performs processing etc. of a voice signal in a telephone call by the client 6 and other telephones.

On the other hand, the server 7 specifies a telephone number by which the nuisance call is made based on the nuisance call information collected from the plurality of the clients 6 and accumulates the telephone number as an incoming call rejection number. Further, the server 7 transmits (provides) the accumulated incoming call rejection numbers to the clients 6. Further, the server 7 optimizes a weight etc. of each keyword by re-learning based on the nuisance call information on the accumulated incoming call rejection numbers and transmits (provides) the weight etc. of each keyword to the clients 6. This server 7 includes the communication management unit 701, the nuisance call information acquisition unit 702, the incoming call rejection number DB 706, the nuisance call information DB 710, the keyword weight setting unit 715, and the weighting function transmission unit 712. Further, although not illustrated in FIG. 20A, the server 7 includes the incoming call rejection candidate DB 703, the incoming call rejection number decision unit 704, the incoming call rejection number management unit 705, and the incoming call rejection number transmission unit 707 explained in the fifth embodiment. Further, the server 7 may include the weighting function learning unit 711 explained in the sixth embodiment.

The communication management unit 701 of the server 7 manages communication with the plurality of the clients 6. The nuisance call information acquisition unit 702 acquires the nuisance call information transmitted from the clients 6. The nuisance call information acquisition unit 702 accumulates the acquired nuisance call information in the nuisance call information DB 710 and the incoming call rejection candidate DB 703 (not illustrated).

The keyword weight setting unit 715 sets a weight of each keyword registered in the keyword list based on the data accumulated in the nuisance call information DB 710 and the incoming call rejection number DB 706. As illustrated in FIG. 20B, the keyword weight setting unit 715 includes a keyword statistic amount calculation unit 715a and a weight setting unit 715b. Based on the nuisance call information and the data of the incoming call rejection numbers, the keyword statistic amount calculation unit 715a calculates the number of the detected keywords used in the nuisance call from the incoming call rejection number. Based on calculation results of the keyword statistic amount calculation unit 715a, the weight setting unit 715b sets a weighting factor corresponding to each keyword.

The weighting function transmission unit 712 transmits to the client 6 a weight, a weighting function, etc. of each keyword obtained by re-learning.

FIG. 21 is a diagram illustrating an example of a weighted keyword list. As illustrated in FIG. 21, a first list 143-3 and a second list 143-4 are registered in the weighted keyword list 143. A plurality of keywords that are prone to appear frequently in the case in which the call time T1 or the total voice section length T2 is equal to or greater than the predetermined threshold TTH are registered in the first list 143-3 along with a weight $\beta(i)$ corresponding to the keyword. On the other hand, a plurality of keywords that are prone to appear frequently in the case in which the call time T1 or the total voice section length T2 is less than the threshold TTH are registered in the second list 143-4 along with a weight $\gamma(j)$ corresponding to the keyword.

Figure 22A:
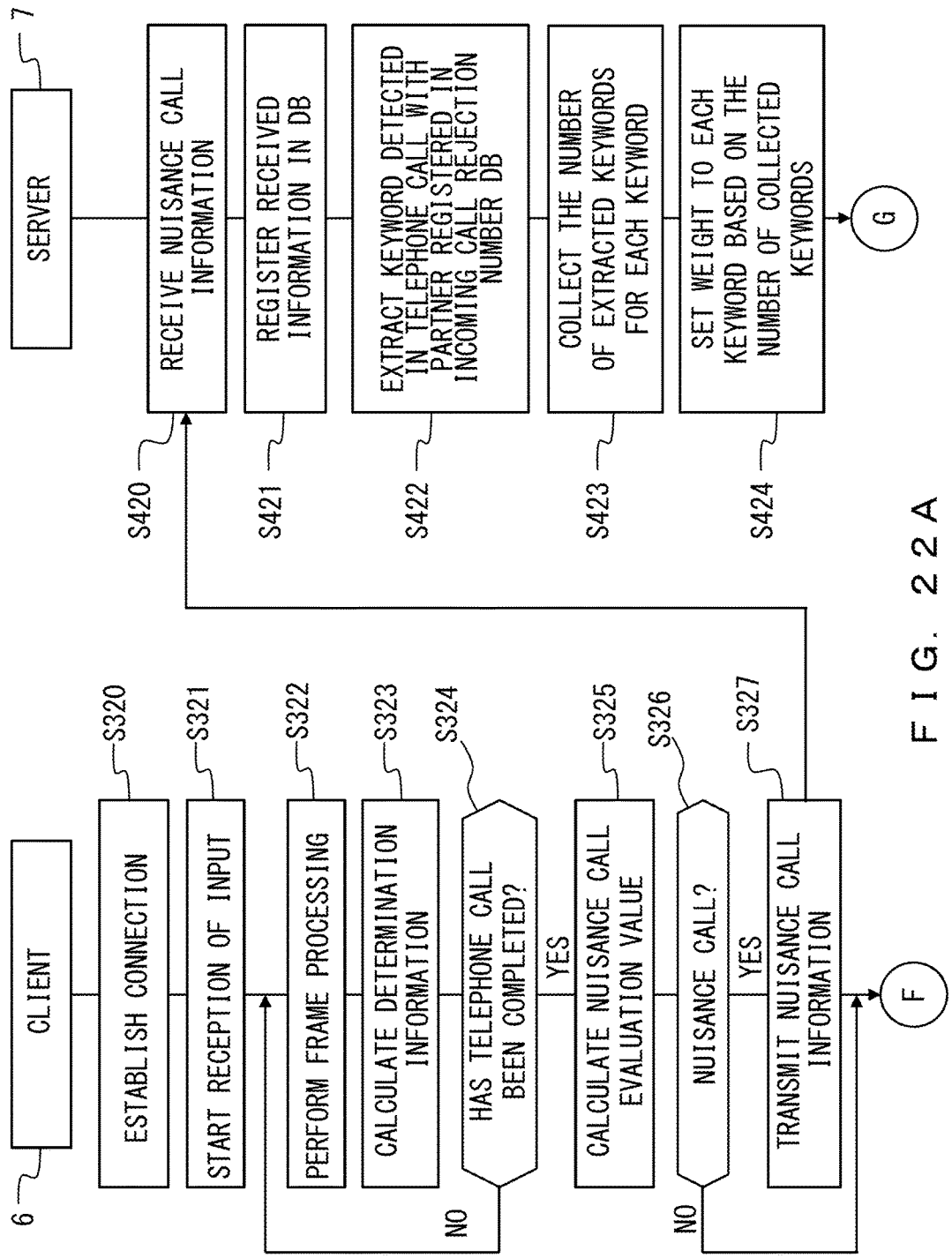
FIG. 22A is a sequence diagram (part 1) illustrating processing that is performed by the nuisance call detection system according to the seventh embodiment.
Figure 22B:
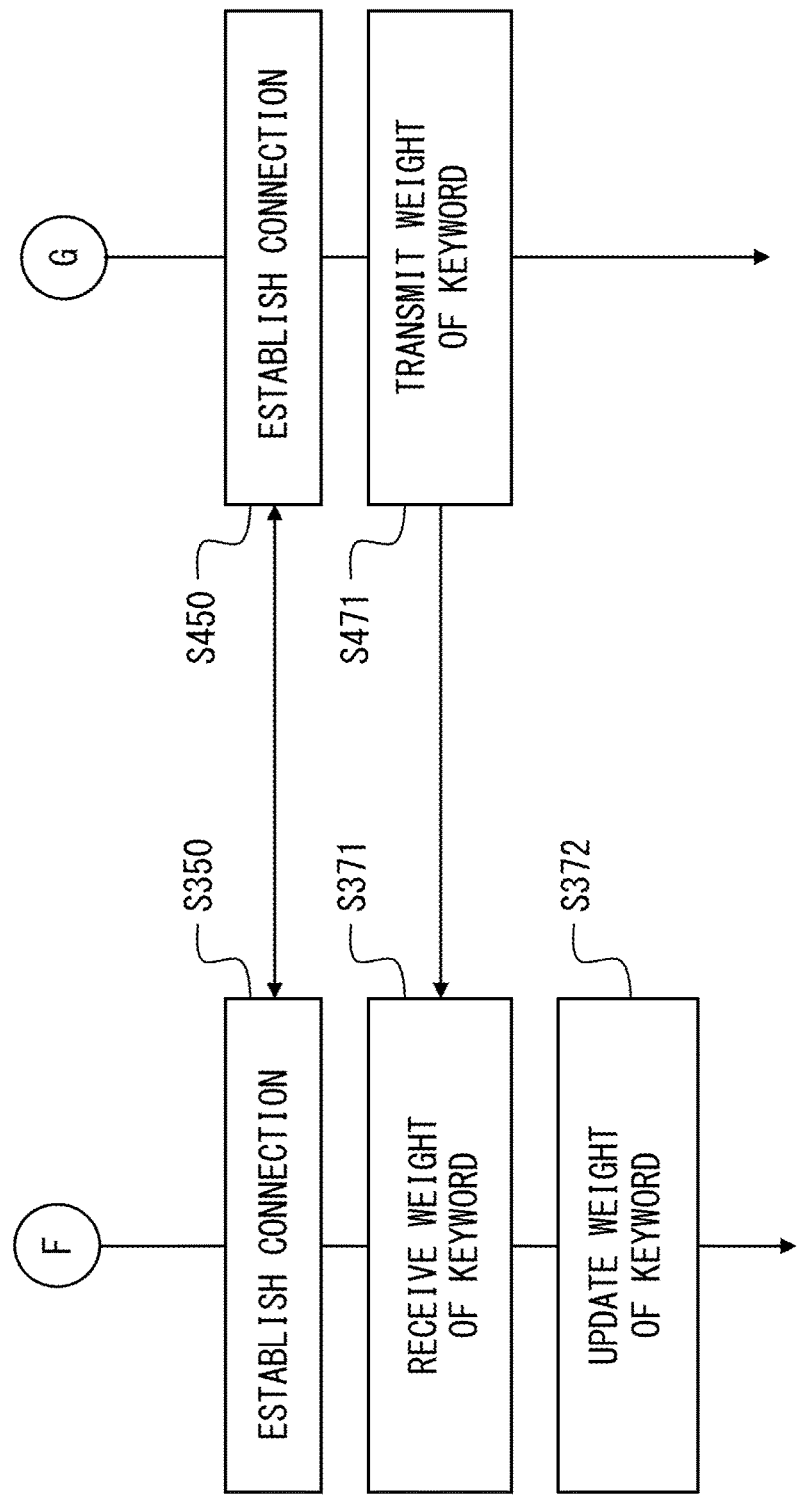
FIG. 22B is a sequence diagram (part 2) illustrating processing that is performed by the nuisance call detection system according to the seventh embodiment.

FIG. 22A is a sequence diagram (part 1) illustrating processing that is performed by the nuisance call detection system according to the seventh embodiment. FIG. 22B is a sequence diagram (part 2) illustrating processing that is performed by the nuisance call detection system according to the seventh embodiment.

In the nuisance call detection system of the present embodiment, as described above, when a nuisance call is detected by the client 6, the nuisance call information is transmitted to the server 7 from the client 6.

As illustrated in FIG. 22A, the client 6 first establishes a connection in response to an establishment request for a connection regarding a telephone call from other telephones (step S320). The process of step S320 is performed by the connection control unit 606 of the client 6. The connection control unit 606 refers to the incoming call rejection number DB 605 and determines that a telephone number of a telephone that makes the establishment request for the connection is not the incoming call rejection number, so that the connection is established in response to the establishment request.

When the connection is established, the client 6 starts reception of an input of call signals (step S321), and performs frame processing (step S322) and calculation processing (step S323) of the determination information. The process of steps S321 to S232 is performed by the nuisance call detection device 602. As the process of steps S321 to S232, the nuisance call detection device 602 performs the process (see FIG. 2) of steps S100 to S102 explained in the first embodiment or the process (see FIG. 6A) of steps S200 to S206 explained in the second embodiment. Further, the client 6 repeats the process of steps S322 and S232 until a telephone call has been completed (step S324).

When the telephone call has been completed (step S324; Yes), the client 6 performs a process (step S325) for calculating the nuisance call evaluation value regarding the telephone call that has been performed immediately before. The process of step S325 is performed by the nuisance call detection device 602 of the client 6. As the process of step S325, for example, the client 6 performs the process (see FIG. 6B) of steps S208 to S213 explained in the second embodiment or the process (see FIG. 10) of steps S220 to S226 explained in the third embodiment.

Here, when the client 6 performs the process of steps S220 to S226 explained in the third embodiment as the process of step S325, for example, the keyword evaluation value EVK is calculated by the following formula (7) in step S225.

$$EVK = \alpha \sum_j \{NK2(j) \times \gamma(j)\} + (1-\alpha) \sum_i \{NK1(i) \times \beta(i)\} \quad (7)$$

NK1($i$) and $\beta(i)$ of formula (7) are the number of the detected keywords and a weight of the i-th keyword in the first list 143-3, respectively. Further, NK2($j$) and $\gamma(j)$ of formula (7) are the number of the detected keywords and a weight of the j-th keyword in the second list 143-4, respectively.

After the process of step S325, the client 6 determines whether the target telephone call is a nuisance call, based on the calculated nuisance call evaluation value (step S326). If the target telephone call is a nuisance call (step S326; Yes), the client 6 then transmits the nuisance call information to the server 7 (step S327). The process of step S327 is performed by the nuisance call information transmission unit 603 of the client 6. As the nuisance call information, the client 6 transmits to the server 7 the telephone number and the determination information such as the call time, the stress evaluation value, the keyword evaluation value, the number of the detected keywords for each keyword, and nuisance call evaluation value. Although omitted in FIG.

22A, in the case of transmitting the nuisance call information to the server 7 from the client 6, a process for establishing the connection is performed between the client 6 and the server 7 in accordance with the predetermined communication protocol. Then, when the connection is established, the nuisance call information is transmitted to the server 7 from the client 6. When the transmission of the nuisance call information has been completed, the connection is cut off between the client 6 and the server 7.

When the nuisance call information is received from the client 6 (step S420), the server 7 registers the received information in the nuisance call information DB 710 and the incoming call rejection candidate DB 703 (step S421). The process of steps S420 and S421 is performed by the nuisance call information acquisition unit 702. Although not illustrated in FIG. 22A, after the process of step S421, the server 7 performs the process of steps S402 to S404 explained in the fifth embodiment and updates the data of the incoming call rejection number DB 706.

In parallel with the update process of the data of the incoming call rejection number DB 706 or after the update process, the server 7 extracts a keyword detected in a telephone call with a partner registered in the incoming call rejection number DB 706 (step S422). The process of step S422 is performed by the keyword statistic amount calculation unit 715a of the keyword weight setting unit 715. The keyword statistic amount calculation unit 715a then collects the number of the extracted keywords for each keyword (step S423), and outputs collection results to the weight setting unit 715b.

Based on the number of the extracted keywords for each input keyword, the weight setting unit 715b sets the weights $\beta(i)$ and $\gamma(j)$ of each keyword in the keyword list (step S424). The weights $\beta(i)$ and $\gamma(j)$ of the set keyword are transmitted to the client 6, and at the same time, stored in the holding unit that is not illustrated in FIGS. 20A and 20B.

Further, periodically or when the weights $\beta(i)$ and $\gamma(j)$ of the keyword are set, the server 7 transmits to the client 6 the weights $\beta(i)$ and $\gamma(j)$ after the setting. As illustrated in FIG. 22B, when the weights are transmitted to the client 6, a process (steps S450 and S350) for establishing the connection is performed between the server 7 and the client 6. Then, when the connection is established, the weighting function transmission unit 712 of the server 7 transmits the weights $\beta(i)$ and $\gamma(j)$ to the client 6 (step S471). When the weights $\beta(i)$ and $\gamma(j)$ are received from the server 7 by the weighting function acquisition unit 610 (step S371), the client 6 updates the weights of the keyword of the weighting function holding unit 611 to the received weights $\beta(i)$ and $\gamma(j)$ (step S372).

Subsequently, using the weighting function after re-learning, the client 6 calculates the weighting factor in the case of calculating the nuisance call evaluation value based on the determination information.

Although not illustrated in FIG. 22B, when the connection between the server 7 and the client 6 is established by the process of steps S450 and S350, the server 7 may transmit the data of the incoming call rejection number DB to the client 6 along with the weighting function after re-learning.

As described above, in the nuisance call detection system of the present embodiment, the weights $\beta(i)$ and $\gamma(j)$ are set in each keyword and the weights $\beta(i)$ and $\gamma(j)$ are updated as needed based on the nuisance call information and the incoming call rejection numbers. Consequently, the client 6 can calculate a proper keyword evaluation value in accordance with contents of the ever-changing nuisance call. Therefore, according to the present embodiment, it is possible to more greatly improve determination accuracy of nuisance calls by the keyword evaluation value.

Further, in the nuisance call detection system of the present embodiment, the server 7 collects information on the nuisance call detected by the client 6 and manages telephone numbers in which the incoming call is rejected as a nuisance call to thereby provide the information on the nuisance call to the client 6. Consequently, it is possible for a plurality of clients to share the information on the nuisance call. Therefore, even when the client 6 itself receives an establishment request for the connection from a telephone having a telephone number in which it has not been determined based on the call contents whether the target telephone call is a nuisance call, it is possible to determine without responding that the target telephone call is a nuisance call.

Further, the configuration of the nuisance call detection device 1 and the processes performed by the nuisance call detection device 1 are not limited to the configuration and processes explained in the first to seventh embodiments.

Further, the nuisance call detection device 1 exemplified in the first to seventh embodiments can be executed, for example, using a computer and programs to be executed by the computer.

FIG. 23 is a block diagram illustrating a hardware configuration of the computer.

As illustrated in FIG. 23, the computer 9 includes a processor 901, a main storage device 902, an auxiliary storage device 903, an input device 904, and a display device 905. The computer 9 further includes a communication device 906, an interface device 907, and a storage medium driving device 908. These components 901 to 908 of the computer 9 are connected to each other via a bus 910, and data can be transferred between the components.

The processor 901 is an arithmetic processing unit such as a Central Processing Unit (CPU), and executes various types of programs including an operating system to thereby control operations of the whole computer 9.

The main storage device 902 includes a Read Only Memory (ROM) and a Random Access Memory (RAM). In the ROM, for example, predetermined basic control programs etc. are previously recorded that are read out by the processor 901 at the start of the computer 9. Further, when the processor 901 executes various types of programs, the RAM is used as needed as a working storage area. The RAM of the main storage device 902 can be used for temporary storage (holding) such as the weighting function, keyword list 143, pitch or power of the framed voice signal, or stress evaluation value.

The auxiliary storage device 903 is a storage device with a large capacity as compared to the main storage device 902, such as a Hard Disk Drive (HDD) or a flash memory (including a Solid State Drive (SSD)). In the auxiliary storage device 903, various programs, various data, etc. that are executed by the processor 901 are stored. As a program that is stored in the auxiliary storage device 903, for example, a program for causing the computer 9 to execute a process illustrated in FIGS. 6A and 6B, a program for causing the computer 9 to execute a process illustrated in FIGS. 6A and 10, or the like is included. Further, in the auxiliary storage device 903, for example, a program that enables a voice call between the computer 9 and other telephones (or computers), a program that creates a voice file from a voice signal, or the like can be stored. Further, as data that is stored in the auxiliary storage device 903, for example, the electronic file of the voice call, the incoming call rejection number DB, or the like is included.

The input device 904 is, for example, a keyboard device, and when operated by an operator of the computer 9, the input device 904 transmits to the processor 901 input information associated with its operation contents. Further, the input device 904 may be, for example, a mouse device, a touch panel device superposed on a display surface of the display device 905, or the like.

The display device 905 is, for example, a liquid crystal display. The liquid crystal display displays various types of text, images, or the like in accordance with display data transmitted from the processor 901 etc.

The communication device 906 is a device that connects the computer 9 and other telephones so as to perform communication or make a telephone call via a communication network such as a telephone network or the Internet.

The interface device 907 is, for example, an input-output device that connects an electronics device used for a telephone call of a microphone 10, a receiver (speaker) 11, etc. with the computer 9.

The storage medium driving device 908 is a device that reads out programs or data recorded in a portable storage medium (not illustrated) and writes data etc. stored in the auxiliary storage device 903 in the portable storage medium. As the portable storage medium, for example, a flash memory provided with a connector of a Universal Serial Bus (USB) standard, or a memory card of an SD standard etc. is usable. Further, when an optical disk drive is mounted on the computer 9 as the storage medium driving device 908, an optical disc such as a Compact Disc (CD), a Digital Versatile Disc (DVD), and a Blu-ray Disc (Blu-ray is a registered trademark) is usable as the portable storage medium.

In this computer 9, for example, the processor 901 previously reads and executes from the auxiliary storage device 903 a program for performing a telephone call and waits ready in a state capable of establishing a connection with other telephones. Then, when a connection between the computer 9 and another telephone is established based on a request from the another telephone, the processor 901 executes a program to perform a process illustrated in FIGS. 6A and 6B and performs a process for determining whether the target telephone call is a nuisance call, along with a process regarding the voice call.

For example, the computer 9 may perform extraction processing of pitch of framed voice signals performed in determining whether the target telephone call is a nuisance call, calculation processing of power, voice recognition processing, or the like not only during the telephone call but also after the telephone call. For example, the computer 9 may also determine during the telephone call whether the target telephone call is a nuisance call.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A nuisance call detection device that determines whether a telephone call is a nuisance call, in which, in response to a request from a first telephone, a connection is established between the first telephone and a second telephone, and detects the nuisance call, comprising
a memory configured to store a voice signal during the telephone call, and
a processor configured to:
analyze the voice signal for one telephone call to calculate a plurality of pieces of determination information used for determination as to whether the telephone call is a nuisance call, the plurality of pieces of determination information including a stress evaluation value for a speaker, who performs a telephone call using the second telephone, and including a number of keywords, the stress evaluation value being calculated based on the voice signal for the one telephone call, the keywords being previously specified and being detected from the voice signal for the one telephone call, the number of the keywords being acquired by accumulating a result of the detection of the keyword;
calculate information on a length of a conversation for the one telephone call;
calculate each weighting factor for a respective one of the plurality of pieces of determination information in accordance with the length of the conversation;
calculate a nuisance call evaluation value by summing up values each calculated by multiplying each weighing factor by a corresponding one of the plurality of pieces of determination information;
determine that the one telephone call is a nuisance call when the nuisance call evaluation value is greater than a predetermined threshold; and
output nuisance call information indicating that the one telephone call is a nuisance call when it is determined that the one telephone call is a nuisance call.

2. The nuisance call detection device according to claim 1, further comprising:
a first list configured to specify a keyword that is stored in the memory and appears frequently in a case in which a length of the conversation in the voice signal for the one telephone call is equal to or less than a predetermined length; and
a second list configured to specify a keyword that is stored in the memory and appears frequently in a case in which a length of the conversation is more than a predetermined length, wherein
the processor calculates a weight of the stress evaluation value in calculating the nuisance call evaluation value and that of the number of the detected keywords, and simultaneously calculates a weight of the number of the detected keywords included in the first list and that of the number of the detected keywords included in the second list regarding the number of the detected keywords.

3. The nuisance call detection device according to claim 1, further comprising:
a keyword list configured to include a plurality of keywords and a weighting factor set in each of the plurality of keywords that is stored in the memory, wherein
the processor calculates as the number of the detected keywords a value obtained by adding a value obtained by multiplying the number of the detected keywords by the weighting factor in each of the keywords.

4. The nuisance call detection device according to claim 1, wherein
the processor calculates a call time of the one telephone call as a length of the conversation.

5. The nuisance call detection device according to claim 1, wherein
the processor detects a voice section in the voice signal for the one telephone call in analyzing the voice signal and calculates as a length of the conversation a sum of a time length of the voice section in the voice signal for the one telephone call.

6. The nuisance call detection device according to claim 1, wherein
the processor detects the voice section in the voice signal for the one telephone call in analyzing the voice signal to set the call time of the one telephone call as a length of a first conversation, simultaneously sets as a length of a second conversation a sum of the time length of the voice section in the voice signal for the one telephone call, and further sets as a weighting factor for the determination information the larger weighting factor between the weighting factor calculated based on a length of the first conversation and the weighting factor calculated based on a length of the second conversation with respect to each of the plurality of pieces of determination information.

7. A nuisance call detection system comprising:
a telephone; and
a server configured to be communicably connected to a plurality of the telephones, wherein
the telephone includes;
a memory configured to store a voice signal during a telephone call; and
a processor configured to analyze the voice signal for one telephone call to calculate a plurality of pieces of determination information used for determination as to whether the telephone call is a nuisance call, the plurality of pieces of determination information including a stress evaluation value for a speaker, who performs a telephone call using the second telephone, and including a number of keywords, the stress evaluation value being calculated based on the voice signal for the one telephone call, the keywords being previously specified and being detected from the voice signal for the one telephone call, the number of the keywords being acquired by accumulating a result of the detection of the keyword, calculate information on a length of a conversation for the one telephone call, calculate each weighting factor for a respective one of the plurality of pieces of determination information in accordance with the length of the conversation, calculate a nuisance call evaluation value based on a value by summing up values each calculated by multiplying each weighing factor by a corresponding one of the plurality of pieces of determination information, and determine that the one telephone call is a nuisance call when the nuisance call evaluation value is greater than a predetermined threshold, output nuisance call information indicating that the one telephone call is a nuisance call when it is determined that the one telephone call is a nuisance call, and wherein
the server includes:
a memory configured to store information about the nuisance call detected in the plurality of the telephones; and
a processor configured to transmit to the plurality of the telephones a telephone number in which the decided incoming call is rejected after a telephone number is decided in which an incoming call is rejected as a nuisance call based on information about the acquired nuisance call.

8. A nuisance call detection method for determining whether a telephone call is a nuisance call, in which, in response to a request from a first telephone, a connection is established between the first telephone and a second telephone, and detecting the nuisance call, comprising:
analyzing, by a processor, a voice signal for one telephone call to calculate a plurality of pieces of determination information used for determination as to whether the telephone call is a nuisance call, the plurality of pieces of determination information including a stress evaluation value for a speaker, who performs a telephone call using the second telephone, and including a number of keywords, the stress evaluation value being calculated based on the voice signal for the one telephone call, the keywords being previously specified and being detected from the voice signal for the one telephone call, the number of the keywords being acquired by accumulating a result of the detection of the keyword;
calculating, by the processor, information on a length of a conversation for the one telephone call;
calculating, by the processor, each weighting factor for a respective one of the plurality of pieces of determination information in accordance with the length of the conversation;
calculating, by the processor, a nuisance call evaluation value by summing up values each calculated by multiplying each weighing factor by a corresponding one of the plurality of pieces of determination information;
determining, by the processor, that the one telephone call is a nuisance call when the nuisance call evaluation value is greater than a predetermined threshold; and
outputting nuisance call information indicating that the one telephone call is a nuisance call when it is determined that the one telephone call is a nuisance call.

9. The nuisance call detection method according to claim 8, wherein
in a process for calculating the weight, the processor refers to a first list configured to specify a keyword that is stored in the memory and appears frequently in a case in which a length of the conversation in the voice signal for the one telephone call is equal to or less than a predetermined length and a second list configured to specify a keyword that is stored in the memory and appears frequently in a case in which a length of the conversation is more than a predetermined length, separates the number of the detected keywords into the number of the detected keywords included in the first list and the number of the detected keywords included in the second list, and calculates each weight of the number of the detected keywords.

10. The nuisance call detection method according to claim 8, wherein
in a process for calculating the nuisance call evaluation value, the processor refers to a keyword list configured to include a plurality of keywords and a weighting factor set in each of the plurality of keywords that is stored in the memory, and calculates as the number of the detected keywords a value obtained by adding a value obtained by multiplying the number of the detected keywords by the weighting factor in each of the keywords.

11. The nuisance call detection method according to claim 8, wherein
in a process for calculating the determination information, the processor detects a voice section in the voice signal for the one telephone call in analyzing the voice signal, and in a process for calculating information on a length of the conversation, the processor calculates as a length of the conversation a sum of a time length of the voice section in the voice signal for the one telephone call.

12. The nuisance call detection method according to claim 8, wherein
in a process for calculating the determination information, the processor detects the voice section in the voice signal for the one telephone call in analyzing the voice signal,
in a process for calculating information on a length of the conversation, the processor calculates the call time of the one telephone call as a length of a first conversation and simultaneously calculates as a length of a second conversation a sum of the time length of the voice section in the voice signal for the one telephone call, and
in a process for calculating the weight, the processor sets as a weighting factor for the determination information the larger weighting factor between the weighting factor calculated based on a length of the first conversation and the weighting factor calculated based on a length of the second conversation with respect to each of the plurality of pieces of determination information.

13. A non-transitory computer-readable recording medium having stored therein a program for causing a computer to execute a process for determining whether a telephone call is a nuisance call, in which, in response to a request from a first telephone, a connection is established between the first telephone and a second telephone, and detecting the nuisance call, the process comprising:

analyzing a voice signal for one telephone call to calculate a plurality of pieces of determination information used for determination as to whether the telephone call is a nuisance call, the plurality of pieces of determination information including a stress evaluation value for a speaker, who performs a telephone call using the second telephone, and including a number of keywords, the stress evaluation value being calculated based on the voice signal for the one telephone call, the keywords being previously specified and being detected from the voice signal for the one telephone call, the number of the keywords being acquired by accumulating a result of the detection of the keyword;

calculating information on a length of a conversation for the one telephone call;

calculating each weighting factor for a respective one of the plurality of pieces of determination information in accordance with the length of the conversation;

calculating a nuisance call evaluation value by summing up values each calculated by multiplying each of the plurality of pieces of determination information by the weighting factor;

determining that the one telephone call is a nuisance call when the nuisance call evaluation value is greater than a predetermined threshold; and outputting nuisance call information indicating that the one telephone call is a nuisance call when it is determined that the one telephone call is a nuisance call.

* * * * *